June 26, 1962   J. JEAN-MARIE JULES GERIN   3,041,014
HIGH LIFT, HIGHLY EXTENSIBLE DEVICE FOR AIRCRAFT WINGS
Filed Feb. 18, 1958   18 Sheets-Sheet 1

Inventor:
Jacques, Jean-Marie, Jules Gerin

Attorney:
Karl W. Flocks

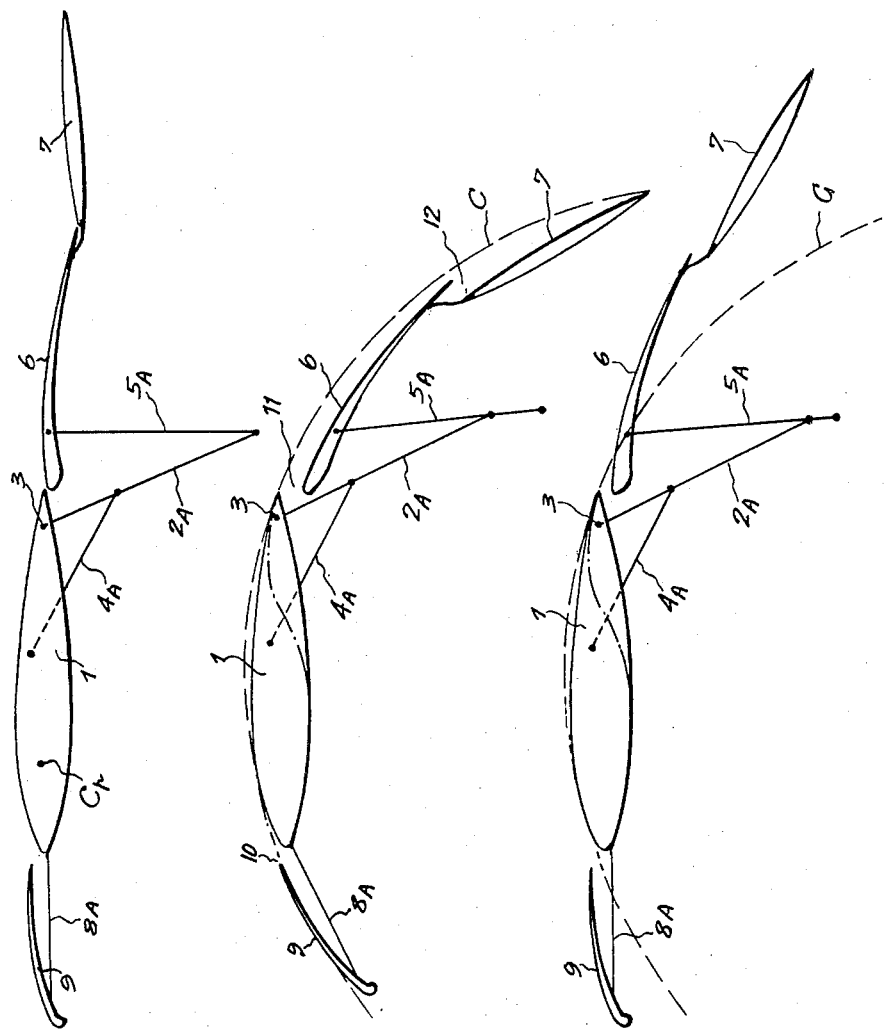

June 26, 1962  J. JEAN-MARIE JULES GERIN  3,041,014
HIGH LIFT, HIGHLY EXTENSIBLE DEVICE FOR AIRCRAFT WINGS
Filed Feb. 18, 1958  18 Sheets-Sheet 3
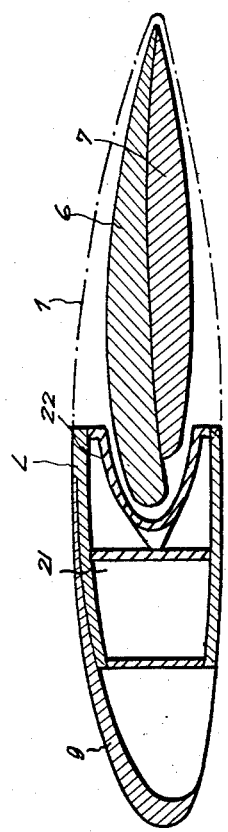
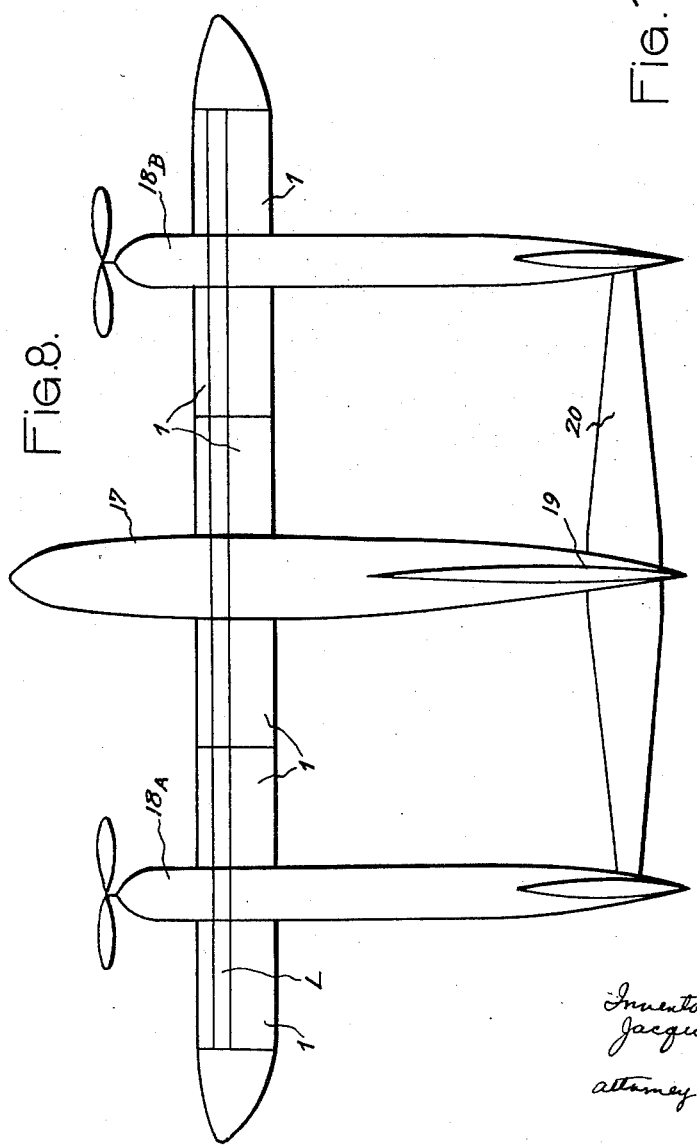

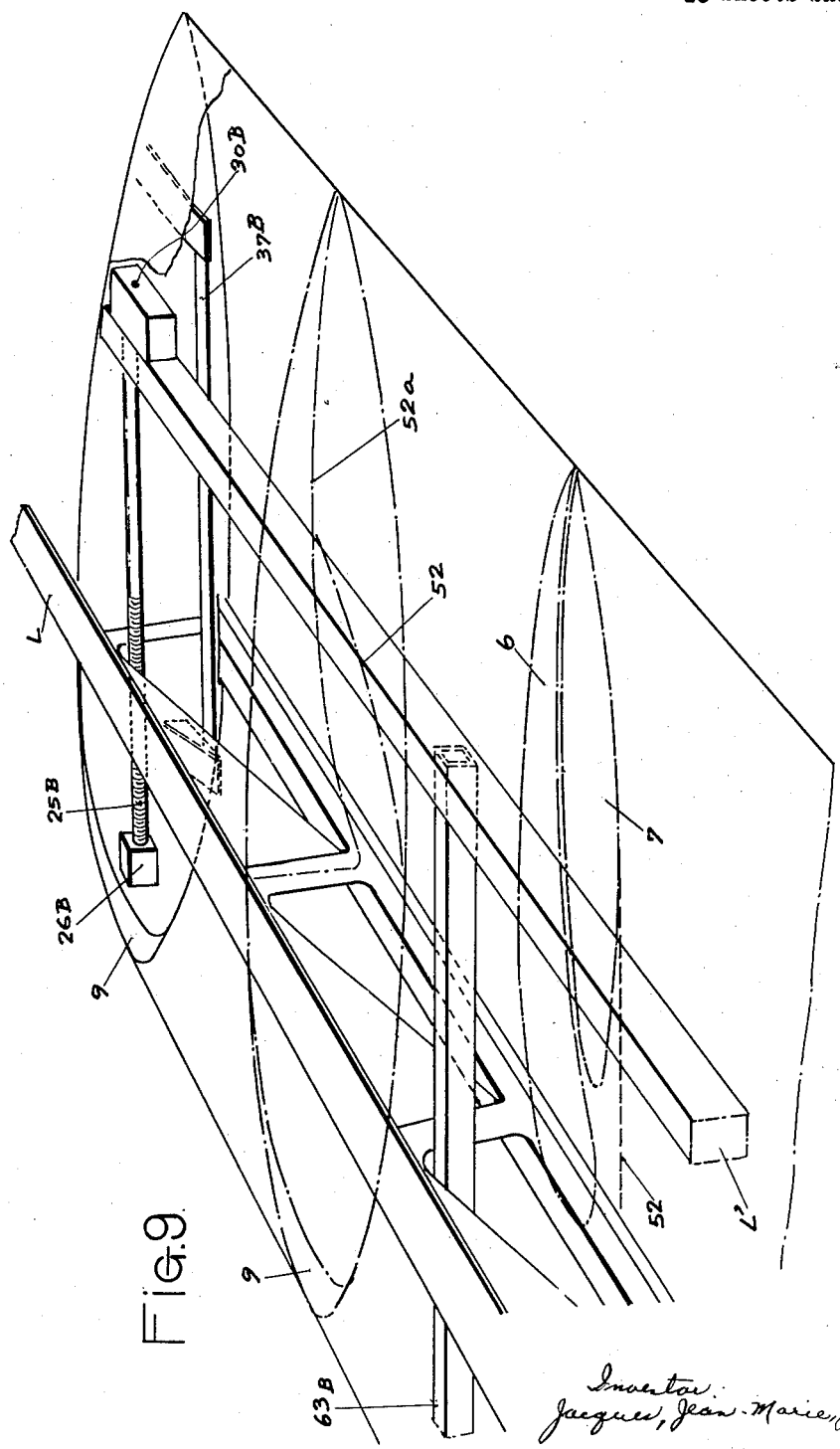

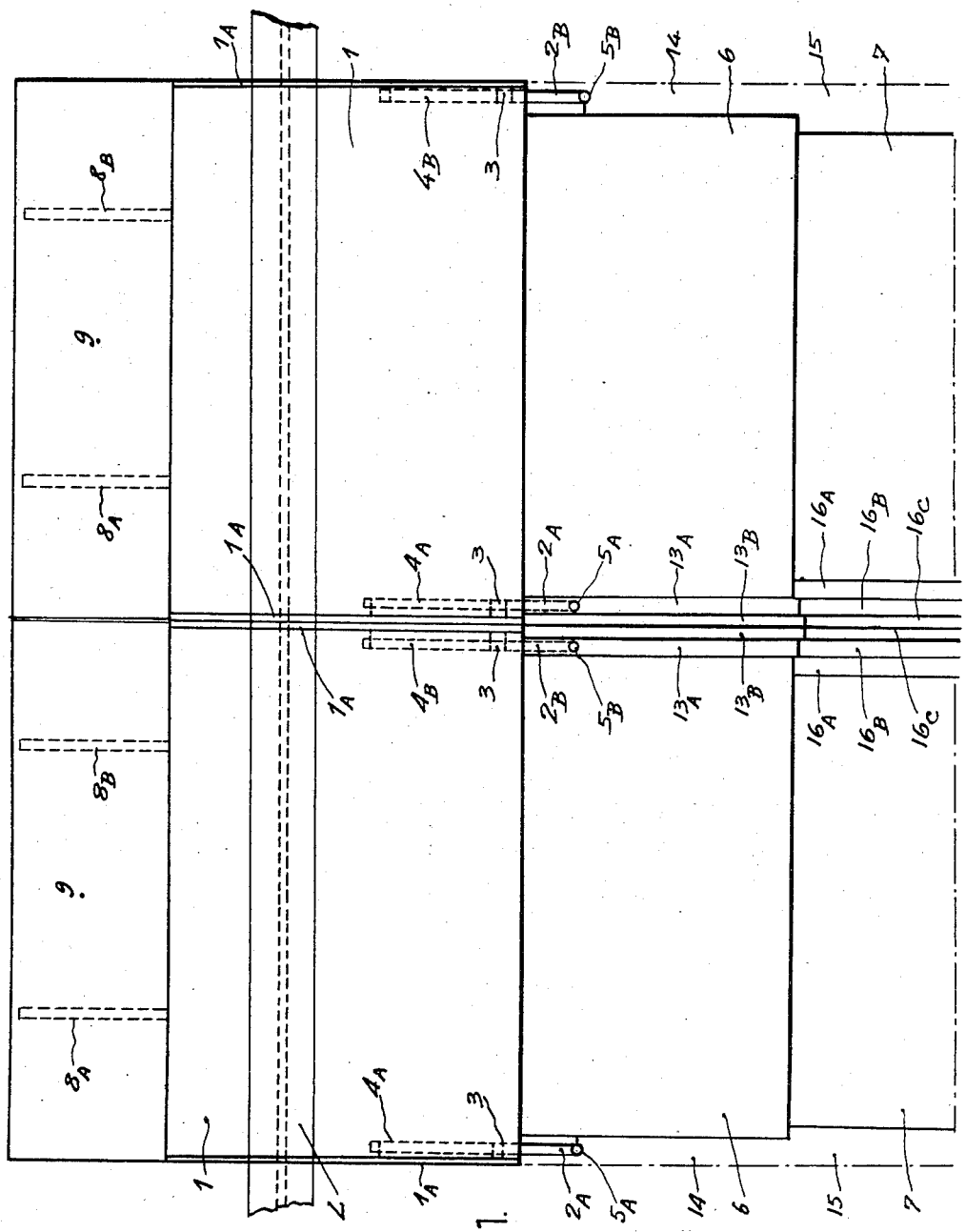

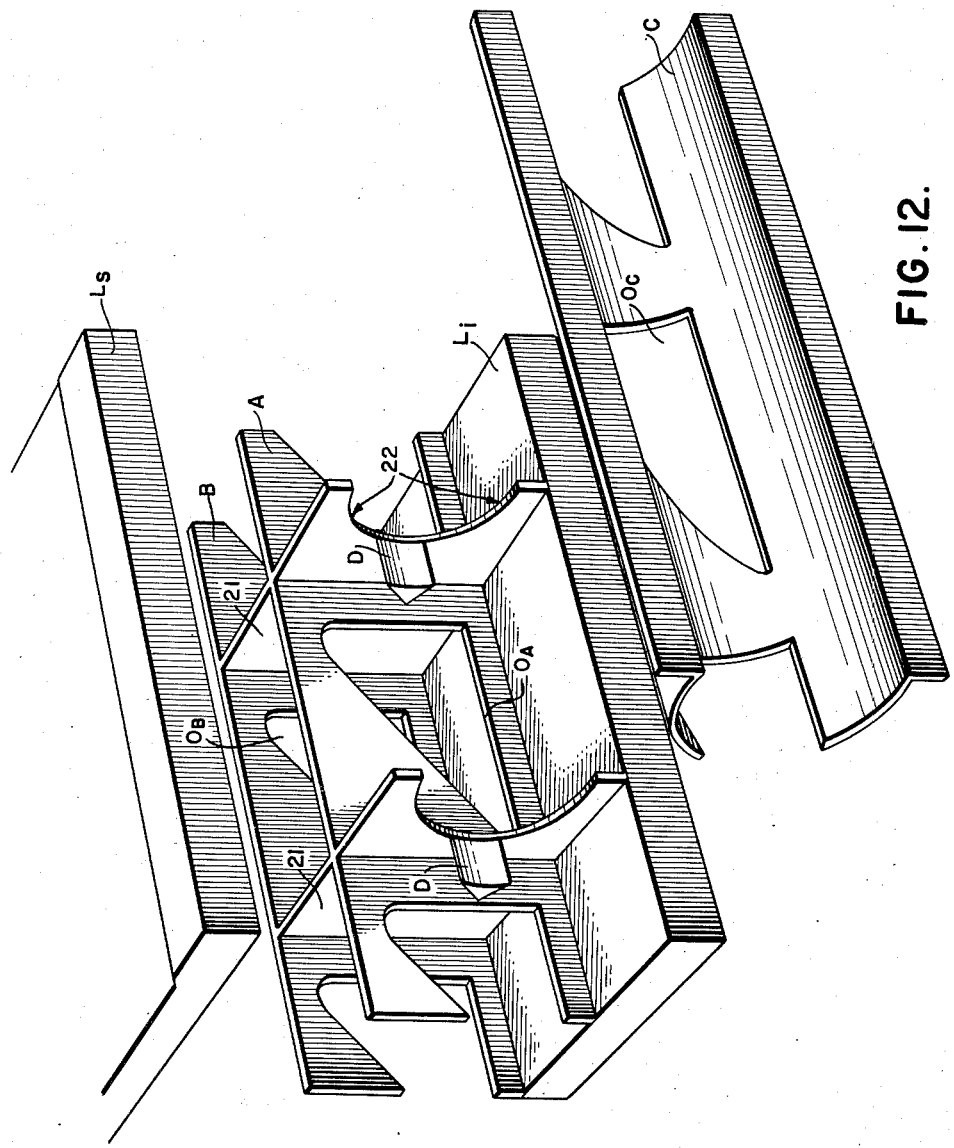

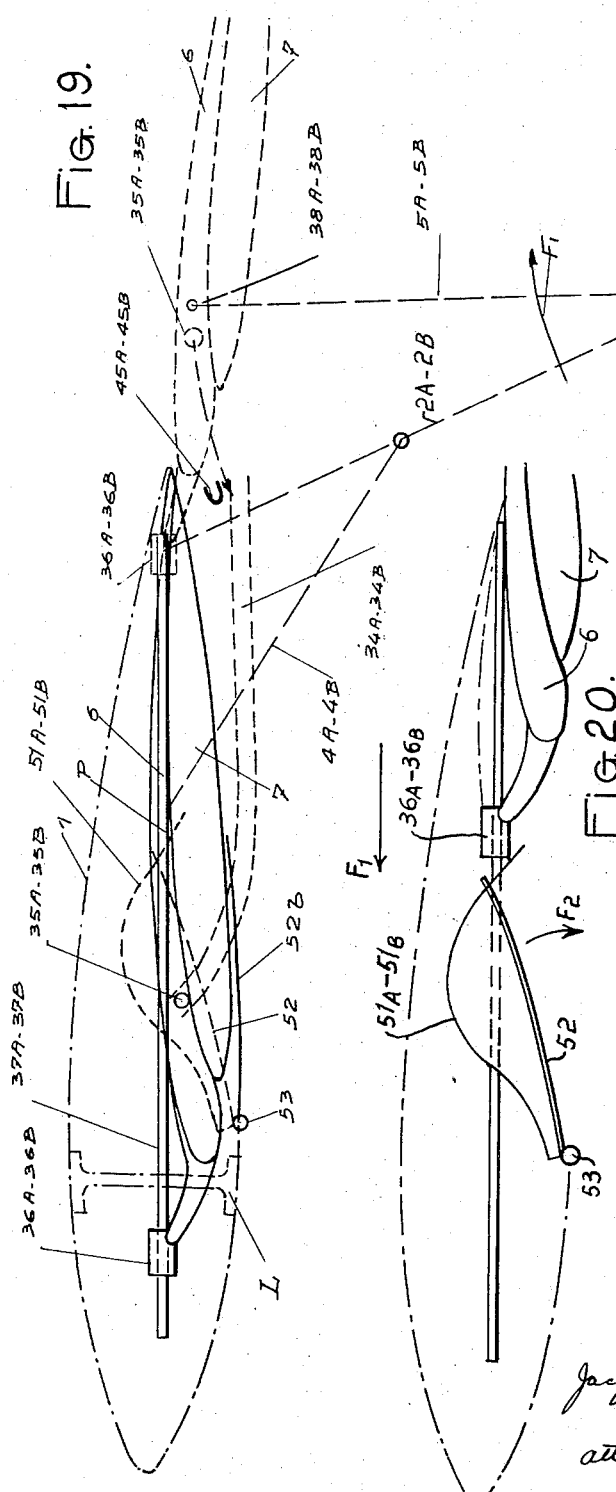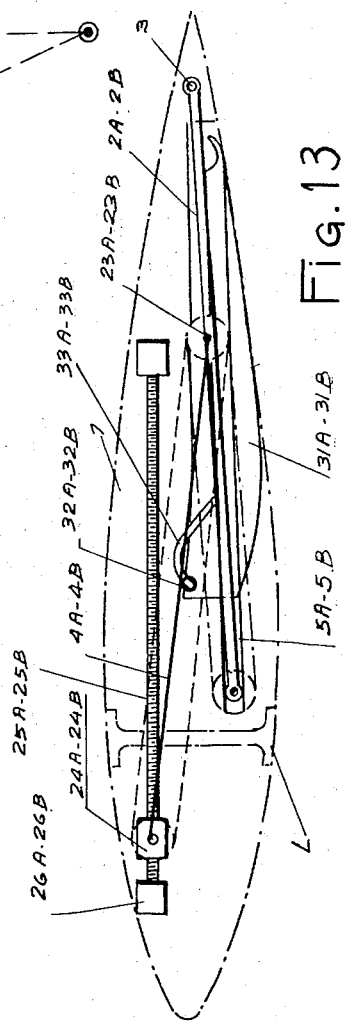

June 26, 1962   J. JEAN-MARIE JULES GERIN   3,041,014
HIGH LIFT, HIGHLY EXTENSIBLE DEVICE FOR AIRCRAFT WINGS
Filed Feb. 18, 1958                              18 Sheets-Sheet 9
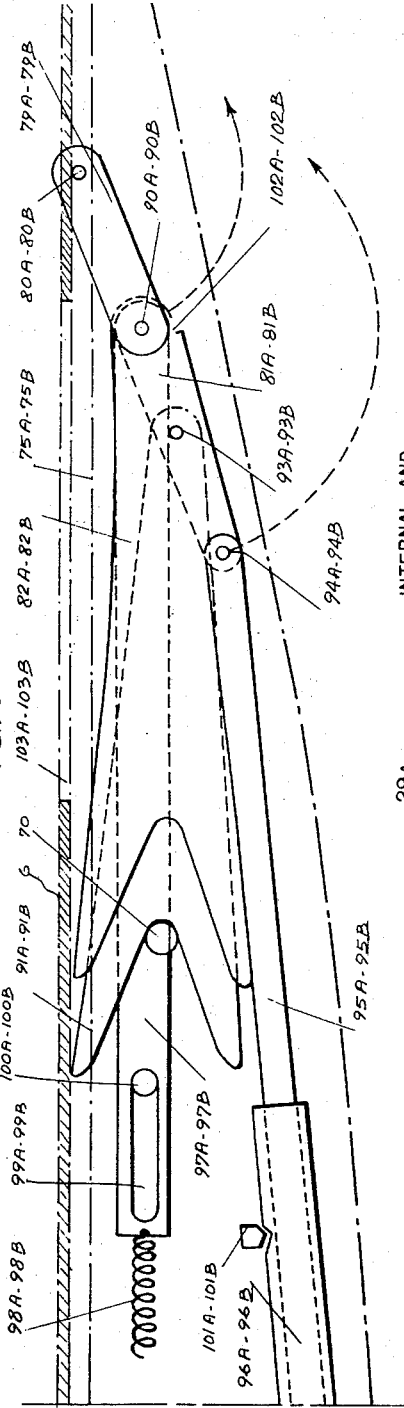
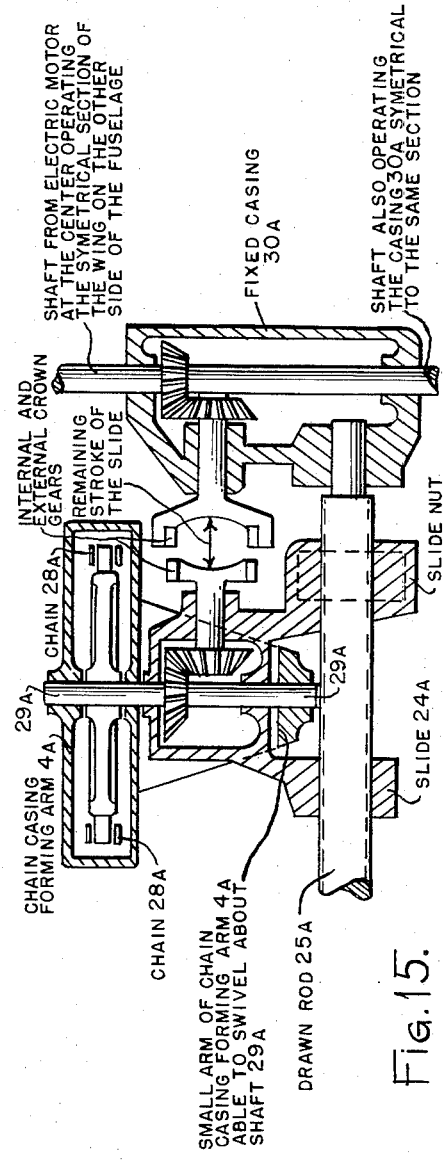

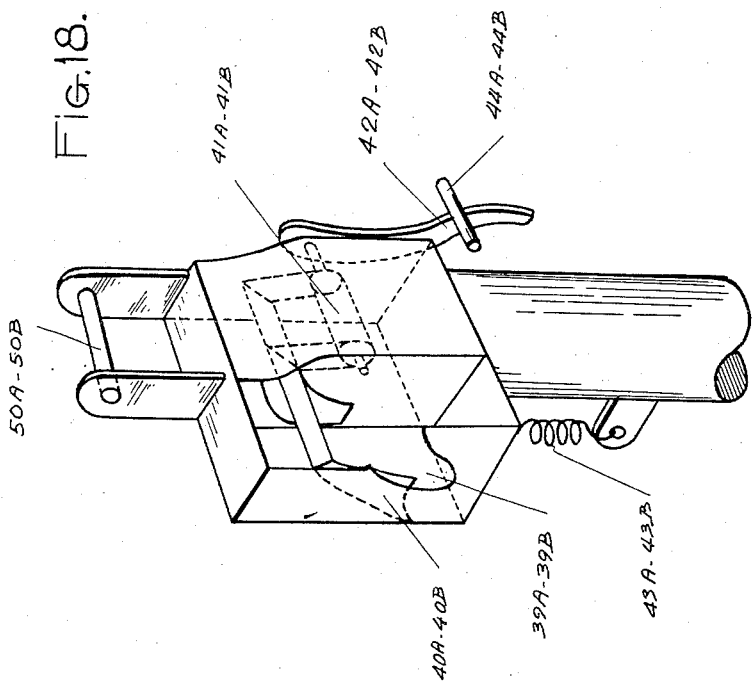
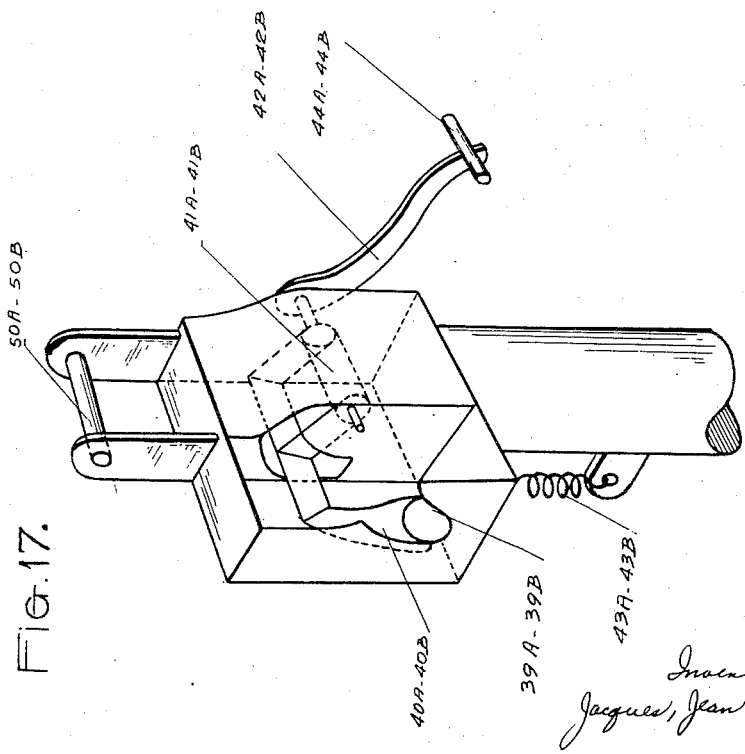

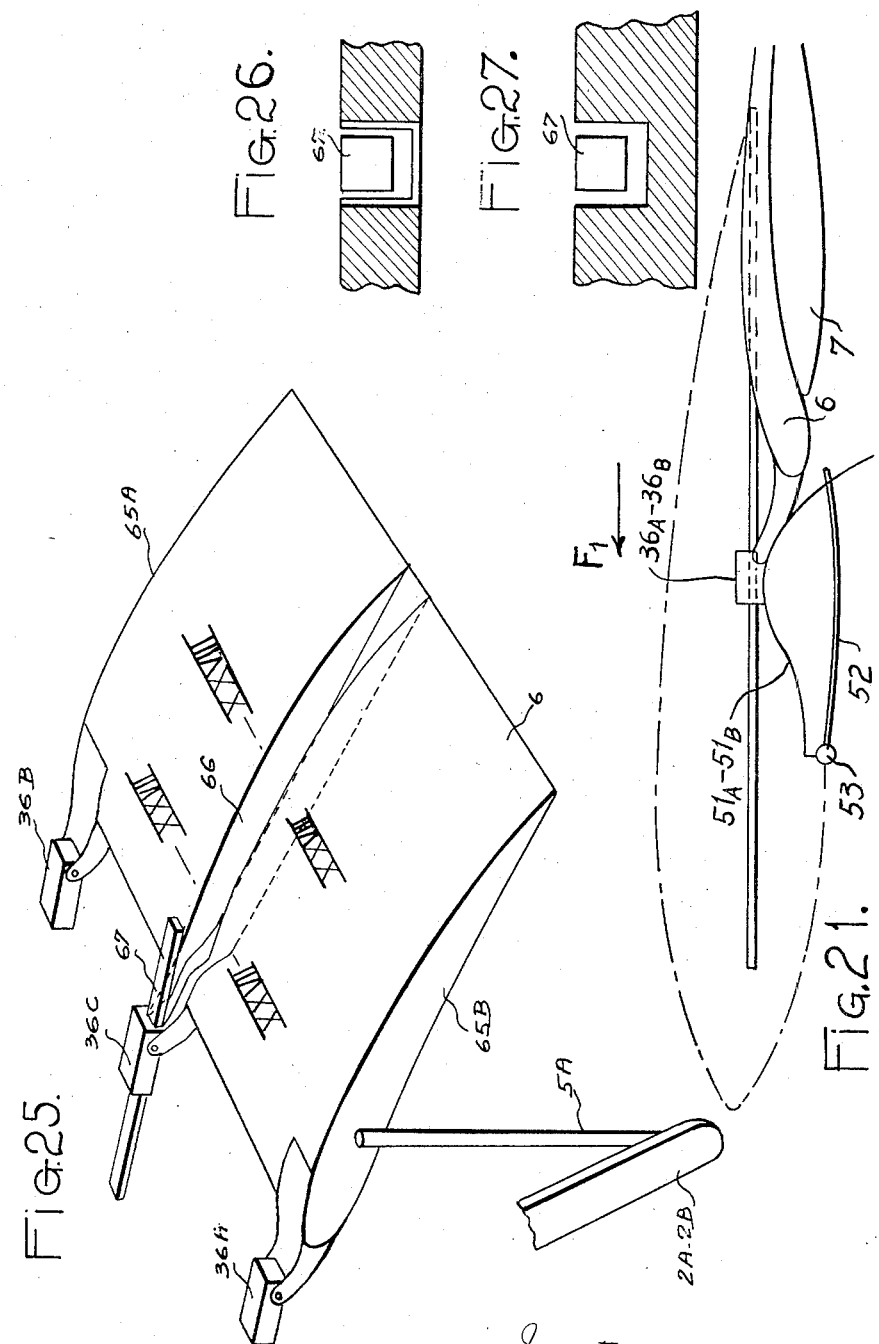

June 26, 1962  J. JEAN-MARIE JULES GERIN  3,041,014
HIGH LIFT, HIGHLY EXTENSIBLE DEVICE FOR AIRCRAFT WINGS
Filed Feb. 18, 1958  18 Sheets-Sheet 13
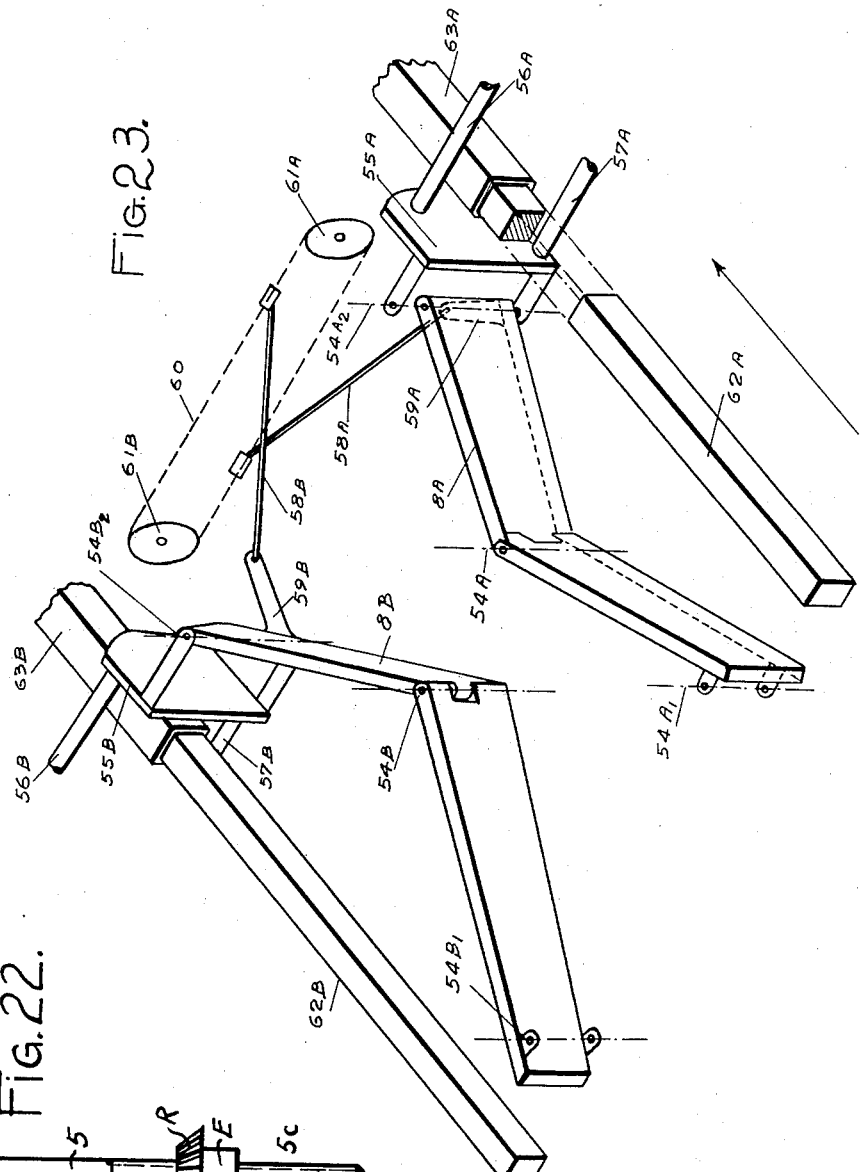
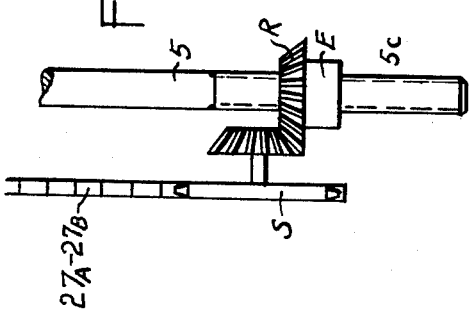
Inventor:
Jacques, Jean-Marie, Jules Gerin
attorney: Karl W. Flocks

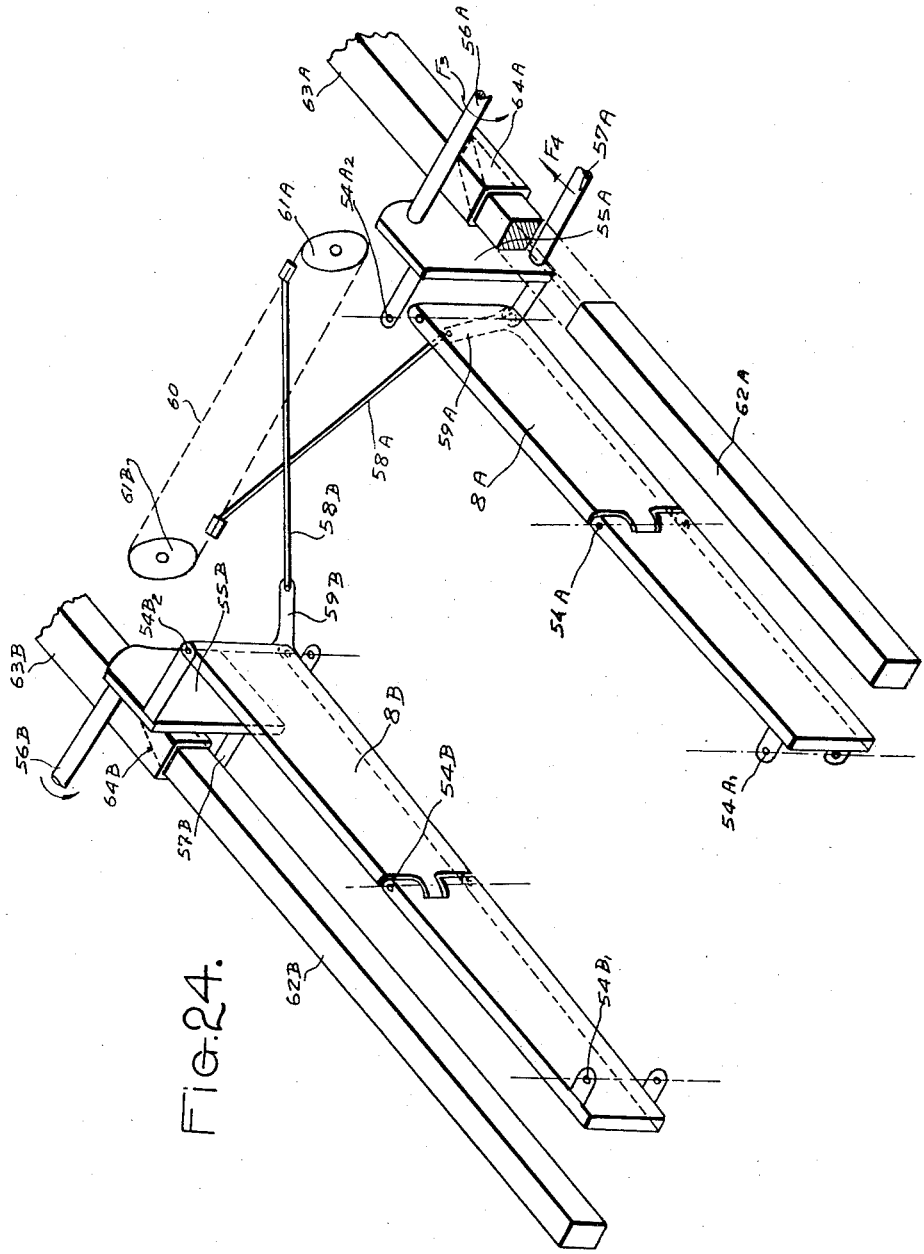

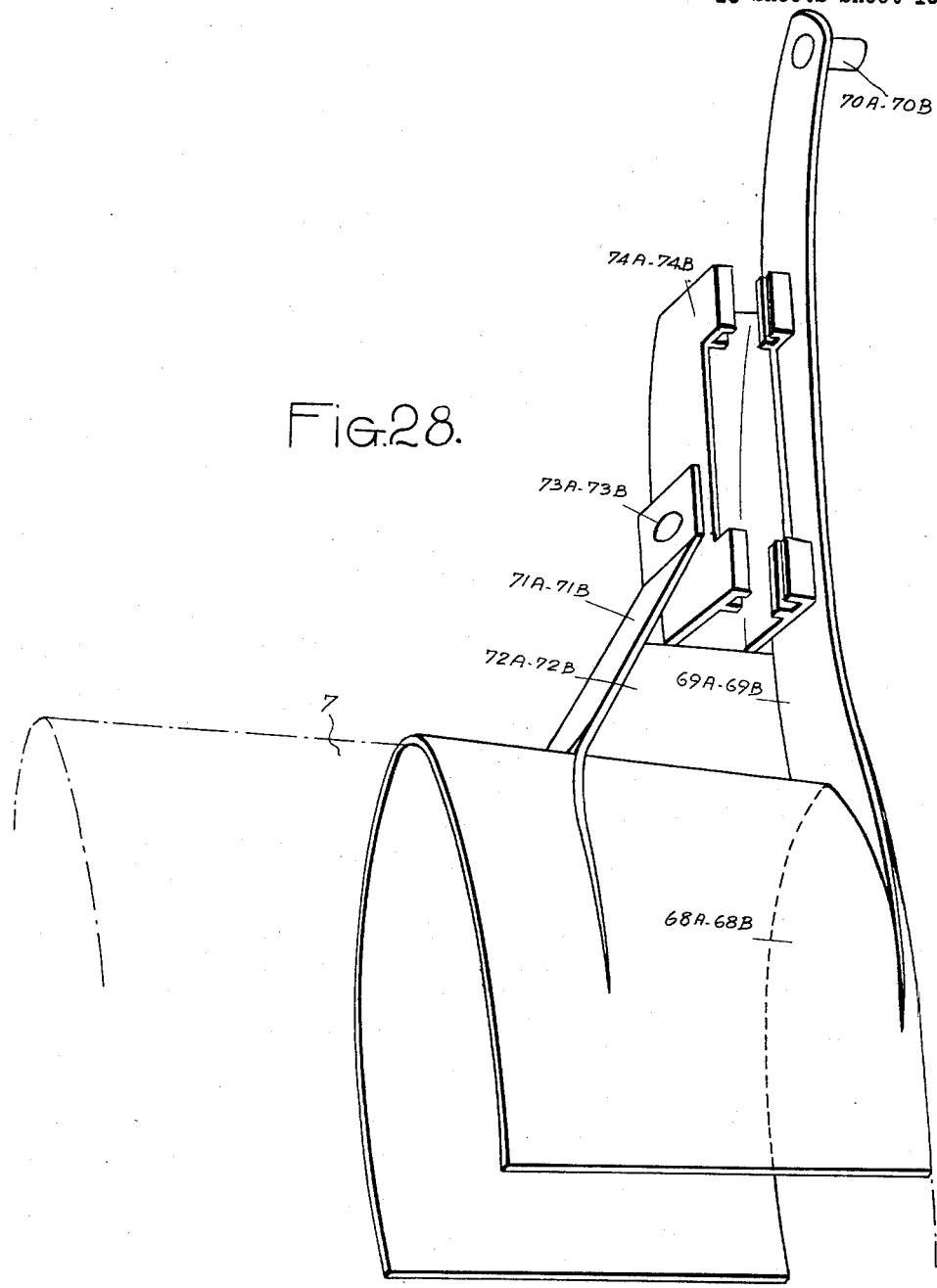

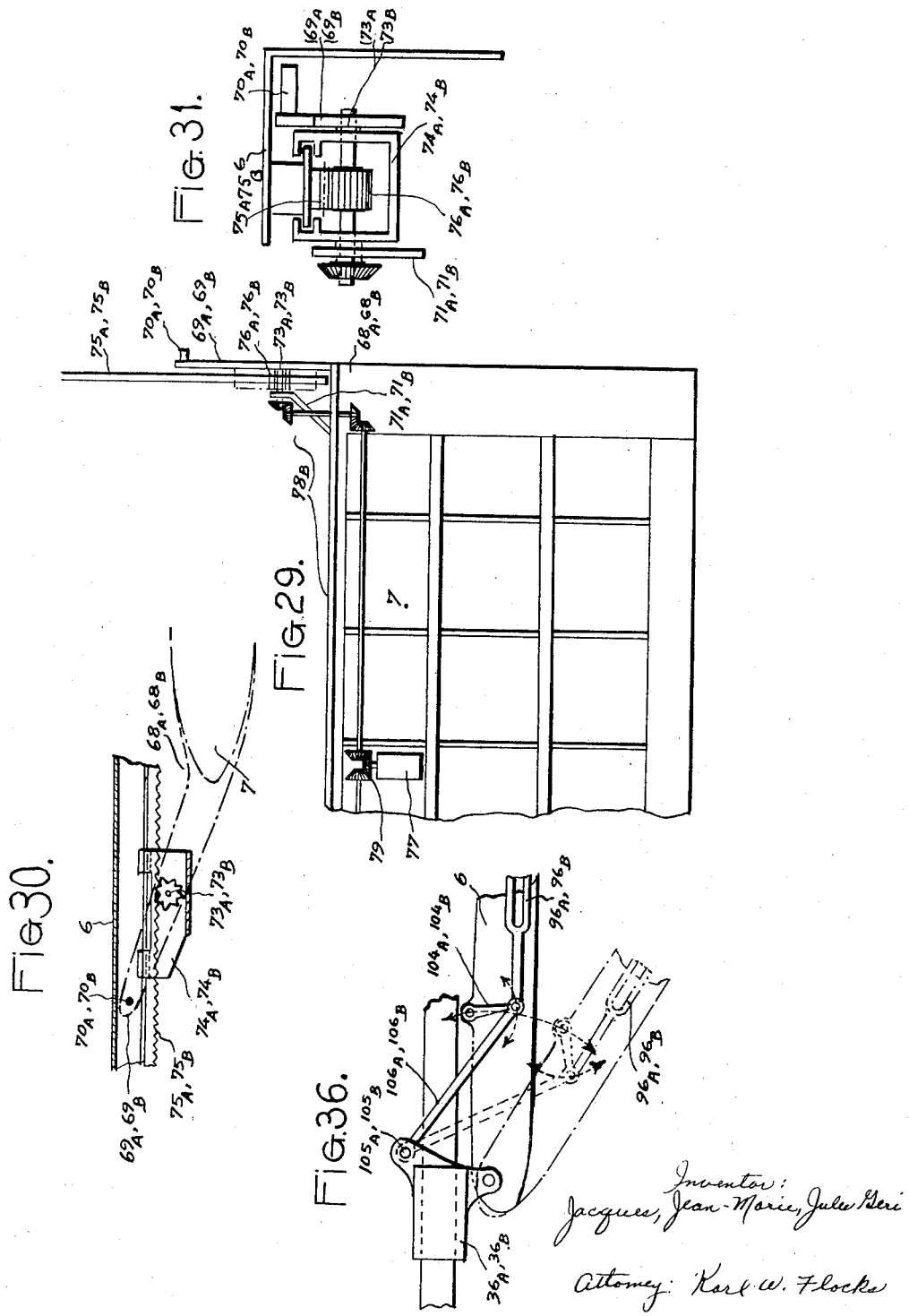

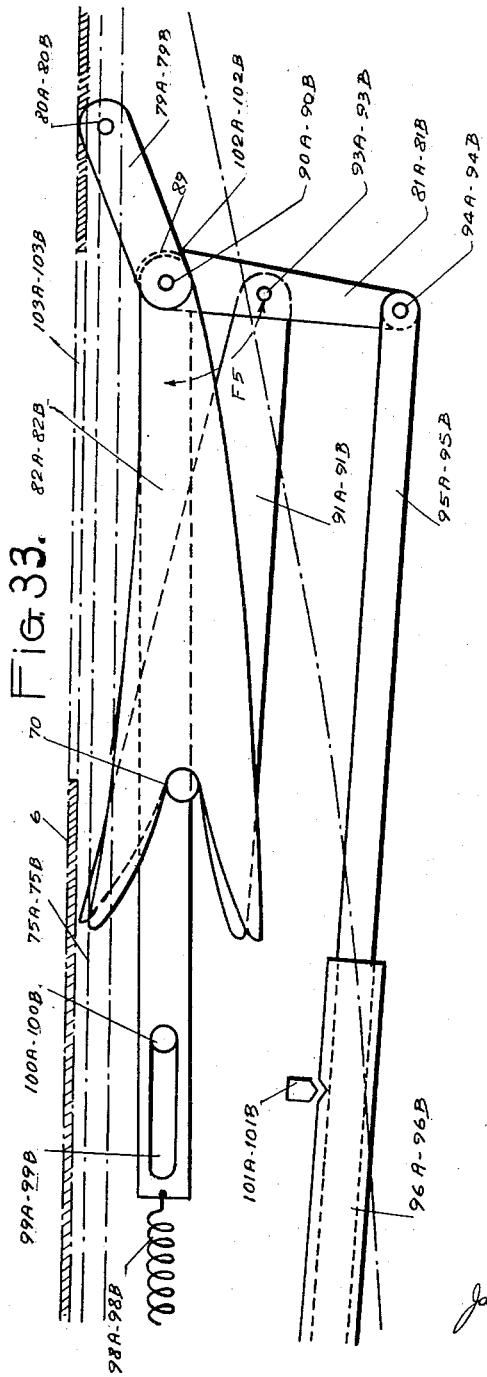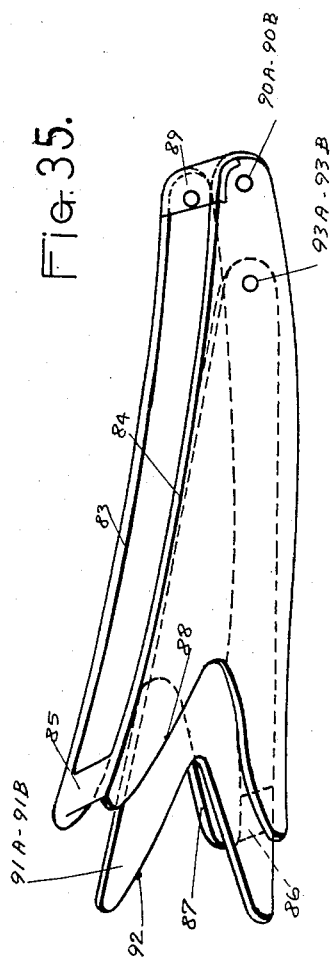

June 26, 1962 J. JEAN-MARIE JULES GERIN 3,041,014
HIGH LIFT, HIGHLY EXTENSIBLE DEVICE FOR AIRCRAFT WINGS
Filed Feb. 18, 1958 18 Sheets-Sheet 18
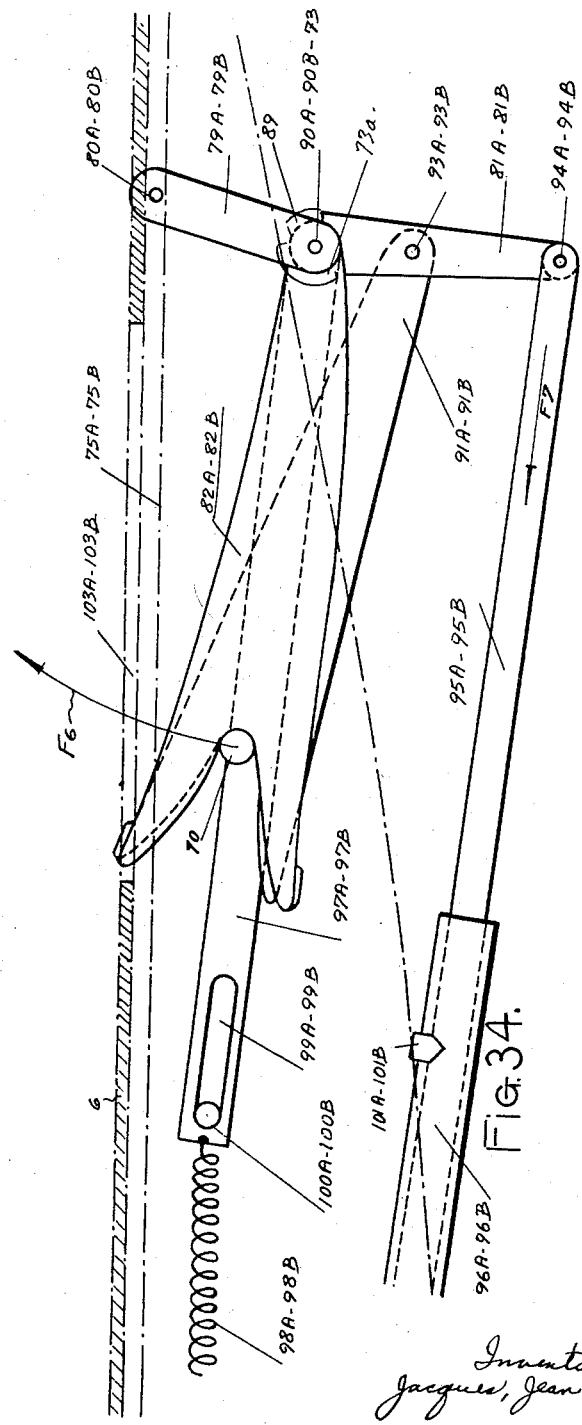

United States Patent Office 3,041,014
Patented June 26, 1962

3,041,014
HIGH LIFT, HIGHLY EXTENSIBLE DEVICE
FOR AIRCRAFT WINGS
Jacques Jean-Marie Jules Gerin, 24 Rue de la Tourelle,
Boulogne-Billancourt, France
Filed Feb. 18, 1958, Ser. No. 715,980
Claims priority, application France May 13, 1957
9 Claims. (Cl. 244—42)

This invention relates in the first place to a highlift, highly extensible device used preferably with a wing having a high aspect ratio at great flying speed and at cruising speed. During slow flying, landing and taking-off, the extension of the movable elements of the device provides a substantial increase of area, new curvatures adapted to the various flying conditions and new wing-settings, thus modifying all the features of said wing and giving to the aircraft provided therewith large speed-ranges.

Thus, the high-speed wing curve which is adapted to great speeds only, can be, for example, symmetrically bi-convex, the wing being of average thickness; it remains perfectly smooth, is free of any asperities, and thus has a very low drag-coefficient, and without rendering the aircraft unserviceable because of a low maximum lift-coefficient, since, on the contrary, for slow flight, landing, taking-off, etc., strong supporting means extend from the wing-section, said means supporting substantially auxiliary surface elements and enabling them to be controlled, said elements modifying entirely all the characteristics of the initial wing-section, the final result being embodied by a new wing, having a much larger surface, and having a new very high maximum lift-coefficient.

The wing provided with this high-lift, highly extensible device according to the invention, is essentially characterised in that it comprises at least two identical portions, symmetrically arranged in relation to the fuselage of the aircraft and which are fitted on a wing spar, the lightening holes of which enable the guides, arms, supports, slide members, etc., of the mechanisms to pass therethrough, each of said portions comprising a high-lift, highly extensible device, arranged in such a way that, when flying at high-speed and at cruising speed, it becomes completely retracted into the wing portion without any member extending theerfrom, whereas on landing, it enables, in particular, the wing section of highest lift to be inscribed on a perfect arc of a circle, this arc subtending a large angle at the centre of the said circle, with favourable positions of several slots.

According to a further feature of the invention, the high-lift device advantageously comprises a front slat and two high-lift flaps, all three being highly extensible, and a control mechanism enabling:

Said flaps and said front slat to be extended outwards during the approach phase toward the landing field or during slow flying conditions, so as to maintain the center of thrust within a zone in which the aircraft can be easily kept in equilibrium by means of the sole elevator control surfaces, by the provision of a wing section having a self-stable double curvature;

The greatest lifting wing-section to be obtained during the landing stage, as has been described hereabove; and During the taking-off stage, a highly lifting wing-section to be obtained, but having a smaller drag than the section for landing.

According to a further feature, the lateral stability of the aircraft having high-lift, highly extensible devices, is achieved;

During high-speed flight, i.e. when the high-lift devices are completely retracted into the wing, by means of end-ailerons or of a lift spoiler of a conventional type;

During reduced-speed flight, that is when the high-lift devices are in extended position, by means of a differential control of both the extreme high-lift devices, then forming banking flaps, these devices moving on either side of an initial neutral position comprised between the maximum and the minimum curvature positions.

Other features and advantages of the present invention will become clear on reading the following description with reference to the accompanying drawings, showing diagrammatically and merely by way of example, several possible embodiments according to the invention.

In these drawings:

FIGURE 5 is a diagram showing the same wing portion after the first flap, the front slat and a second high-lift flap have been extended, the assembly being in a transitory stage, before landing or after taking off, or during low-speed flight;

FIGURE 6 is a diagrammatic view similar to FIGURE 5, the assembly being in a maximum lift position for landing;

FIGURE 7 is a diagram similar to FIGURES 5 and 6, the assembly being this time in taking-off position;

FIGURE 8 is a diagram showing a plan view of an aircraft the wing whereof can advantageously be provided with a high-lift, highly extensible device according to the invention;

FIGURE 9 is a perspective view of the main elements forming a wing provided with the high-lift, highly extensible device according to the invention;

FIGURE 10 is a detail view showing in cross-section a torsion-resisting wing spar-frame;

FIGURE 11 is a plan view of two adjacent wing portions according to the invention, when both flaps and the front slat are extended;

FIGURE 12 is a perspective view of the construction of the wing spar of FIGURE 10;

FIGURES 13 and 14 are enlarged detail views, showing how the mechanism for supporting and extending the first high-lift flap is unfolded;

FIGURE 15 is a cross section of an enlarged detail view of a section of the mechanism for applying power to the chain and sprocket mechanism of FIGURE 14 with the jack in an operational position;

FIGURES 17 and 18 are detail views showing in perspective the upper extremity of the jack, when the jack is respectively in the dotted line position and in the full line position of FIGURE 16;

FIGURE 19 is a diagram showing the extension of the first flap and the retraction thereof into the corresponding main wing portion;

FIGURES 20 and 21 are detail views of the function of the trap in FIGURE 19;

FIGURE 22 shows mechanism for accomplishing linear displacement of the jack;

FIGURES 23 and 24 are detail views showing in perspective the supporting and control mechanism of the front slat, when the latter is partially extended and fully extended;

FIGURE 25 is a detail view showing in perspective an alternative embodiment of the first flap which is provided with an intermediate supporting rib;

FIGURES 26 and 27 are detail views showing cross-sections of the intermediate supporting rib, taken respectively along the lines XXVII—XXVII and XXVIII—XXVIII of FIGURE 25;

FIGURE 28 is an enlarged detail view showing one of the supporting mechanisms secured to the extremity of the leading edge of the second high-lift flap;

FIGURES 29, 30 and 31 are respectively a plan view, an elevation and an end-view of the mechanism for extending the second flap;

FIGURES 32, 33 and 34 are detail views showing in elevation the trailing edge of the first flap as well as the mechanism for controlling the extension of the second flap, in three different operational positions;

FIGURE 35 is a detail view showing in perspective one of the elements of the control mechanism for extending the second flap; and FIGURE 36 is a detail view showing the system for positioning the spindle about which is pivotally mounted the front end of the tube acting as a guide for the pivoting lever of the second flap, when said lever has been made integral with said tube.

The main object of the high-lift, highly extensible device according to the invention is to produce aircraft having a great difference between their flying speed and the landing and take-off speeds. A comparison between FIGURES 1 and 5 on the one hand, and 1 and 6 on the other hand, shows conclusively the high-extension feature of the high-lift device of the invention, as well as the particularly valuable property of inscribing on a perfect arc of a circle, this arc subtending a large angle at the centre of the said circle, the wing-section having the greatest lift, the three slots being in the most favourable location.

The wing of the aircraft diagrammatically consists of a wing-spar L (FIGURES 8, 9, 10, 11 and 12) and of portions defined by master-ribs. The flanges of the wing-spar are of course, continuous, but the web or webs of the spar are interrupted by each master-rib. The wing-spar is advantageously of the type with a lattice web, whether said web be simple, double or multiple. The arrangement of structural members A, B and 21 enable wide lightening holes, of triangular shape for example, to be cut out.

It is through there lightening holes that the guides and the arms or supporting members of the flaps and slats of the high-lift, highly extensible device of the invention pass, as can be seen in FIGURE 9, where the threaded rod 25B of the supporting arm, the guide 37B of the first flap and, towards the front, the slide bar 63B can be seen passing through the lightening or relief holes provided in the web.

A dummy rear-wing-spar L' can complete this structure, which also comprises ribs, a covering, etc., as is usual in the art.

Thus, the wing of the aircraft consists of a certain number of identical portions distributed along its wing-span, as will be seen in greater detail later on. For any given portion, the passage from cruising speed position (FIGURE 1) to the landing position (FIGURE 6) or from the taking-off position (FIGURE 7) to the cruising speed position (FIGURE 1) is effected in the same manner, which is as follows:

In the cruising speed or high-speed flying position, the whole high-lift unit is retracted into the appropriate wing portion 1, the various movable members being enclosed within the wing-section used for high-speed flight, so as to avoid any projections or any breaks of continuity in the surface of the wing portion 1.

The wing used has preferably a high aspect ratio with a bi-convex profile having a low drag, the usual drawback of which i.e. a low maximum lift-coefficient resulting in a very high landing speed, being in the present case of no importance.

Figure 1:
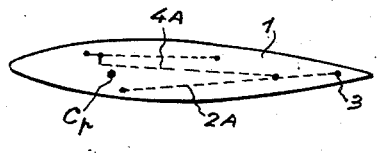
FIGURE 1 is a diagrammatic section of a wing portion according to the invention, the aircraft flying at cruising speed.
Figure 2:
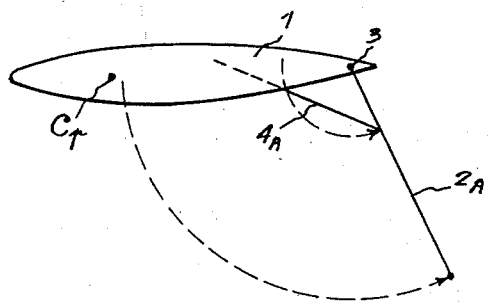
FIGURE 2 is a diagrammatic view similar to FIGURE 1, showing how the supporting system is extended preparatory to the extension of the first high-lift flap.

During a first stage (see FIGURES 2, 11 and 14), two lateral supporting arms 2A, 2B, pivotally mounted at 3 on reinforced master-ribs 1A closing at each extremity the independent portion 1, in the rear part and close to the trailing edge of said portion, are caused to pivot about their axis by the actuation of their respective control arms 4A, 4B and pass therefore from the dotted line position of FIGURE 1 to the position shown in full lines in FIGURE 2.

During a second stage (see FIGURES 3, 11 and 14), two jacks 5A, 5B pivotally connected at their lower end to the corresponding ends of the lateral arms 2A, 2B, as will be seen in detail hereafter, support a first high-lift flap 6 and enable it to extend, the leading edge of which does not form a slot with the trailing edge of the wing portion 1. In the embodiment shown here by way of example, this first high-lift flap 6 comprises in turn a second high-lift flap 7 of great depth, which is, during this operational stage, in a retracted position under the first flap 6.

The extension of the first high-lift flap 6 results in a substantial decrease of the stalling speed of the aircraft and in a slight rearward shift of the centre of thrust $C_p$, readily compensated for by means of the elevators.

During a third stage (see FIGURE 4 and 11), two supporting and control arms 8A, 8B (which will be more fully described later) are mounted on their base, at a quarter and at three quarters, for example, of the leading edge-span of the wing portion 1; they enable the front slat 9 to extend outwards. This extension of the front slat results in a further decrease of the stalling speed of the aircraft, while returning the centre of thrust $C_p$ substantially to its initial position.

During a fourth stage (see FIGURES 5, 11 and 14), the second high-lift flap 7 extends outwards by means of a control mechanism, to be described more fully later on. It must be pointed out that the extension of this second flap 7 is effected with a negative incidence and without any slotting effect, so that while further reducing the speed of the aircraft, the wing-section thus formed by the wing proper, the front slat and both flaps have a double self-stable curvature and the centre of thrust $C_p$ is returned to a position located at about 22% from the leading edge of the thus formed wing-section, said position substantially corresponding to the original position on the first wing-section of reduced chord length used during cruising speed flying. This operational stage is the transitory stage immediately prior to the landing stage or immediately following the taking-off stage, as will be explained later.

During a fifth and last stage (see FIGURE 6), while the front slat 9 and the first flap 6 are progressively inclined in relation to the wing 1, the second flap 7 is simultaneously inclined in relation to the first flap 6, giving rise to slotted effects at 10, 11 and 12 respectively. As can be seen in FIGURE 6, the wing-section which has then the highest lift, is inscribed on a perfect arc of a circle C, this arc subtending a large angle at the centre of the said circle, with the three slots 10, 11 and 12 in their most favourable location.

Figure 4:
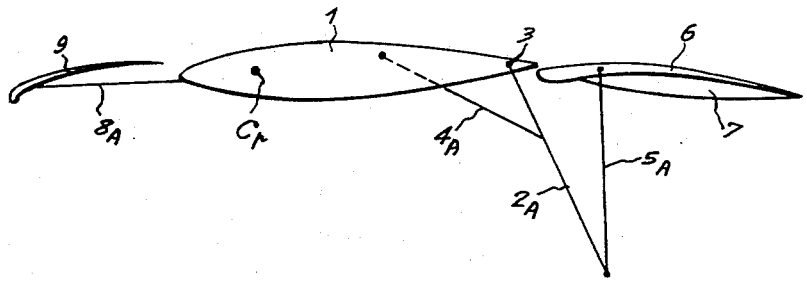
FIGURE 4 is a diagrammatic view of the same wing portion after the first high-lift flap and a high-lift front slat have been extended.

In order to obtain the smallest drag and to facilitate take-off (see FIGURE 7), the front slat 9 then resumes its initial extended position shown in FIGURE 4, while the first flap 6 and the second flap 7 take up intermediate positions between the respective positions they take up during the landing stage (FIGURE 6) and during the transitory stage (FIGURE 5).

After taking-off, the wing-section of great depth is progressively returned to the transistory position (FIGURE 5), then the second flap 7 is retracted under the first flap 6 (FIGURE 4); the front slat 9 is in turn retracted into the leading edge of the wing 1; then the first flap 6 is in turn retracted into the wing 1; lastly, the supporting arms 2A, 4A, 2B, 4B are retracted into the wing 1. The wing unit of the aircraft is then in cruising flight position (FIGURE 1).

It has already been said that the wing-span consists of a plurality of identical portions 1, the operation of the high-lift device with which each portion is equipped, having just been described.

Although the extension of all the high-lift devices could be carried out simultaneously, it is preferable, from a practical point of view, to extend successively only the high-lift devices on pairs of wing portions which are symmetrical in relation to the fuselage of the aircraft.

In view of the high extension of the high-lift device according to the invention, it will be desirable from the practical point of view, in order to withstand the torsion, to use an aircraft of a type such as shown by way of example in FIGURE 8.

This aircraft comprises a central fuselage 17 and two lateral beams 18A, 18B, which can be spaced further apart, if required, than the aircraft with lateral beams hitherto known. The fuselage 17 and the beams 18A, 18B are connected by the wing 1, divided into portions or lengths, each one being equipped with the high-lift, highly extensible device of the type which has just been described. The rear part 19 of the fuselage is provided with a horizontal tail-unit 20, the ends of which are secured to the corresponding ends of the lateral beams 18A, 18B. This horizontal tail unit 20, which can be reinforced if needed, withstands the torsion of the wing transmitted by the lateral beams.

It will be obvious that this type of craft has only been shown by way of example, without limiting the invention.

In FIGURES 10 and 12 there is shown likewise by way of example an advantageous embodiment of a good torsion-resistant frame.

According to this embodiment, each wing portion 1 consists of a frame which is completely closed laterally at each master-rib 1A (see FIGURES 9 and 11), while intermediate said master-ribs, the frame comprises intermediate cross-bars, such as 21, having a generally rectangular shape, thus permitting them to be opened without reducing their resistance along a triangle 22 for the retraction of the flaps 6 and 7 into the wing. As shown in FIGURES 10 and 12, the U-shaped cross-hatched area appearing in FIGURE 10 is in fact comprised by a simple sheet C curved so as to adapt itself to the triangular openings 22 in the cross-bars 21. Between this sheet C and the beam A are placed, if required, supporting members D. It is evident that the beams A, B and C are provided with corresponding openings $O_A$, $O_B$, $O_C$, which lighten the unit on the one hand, and on the other hand allow passage of members cordwise with respect to the wing unit (such as for instance, the members $63_B$, $25_B$, and $37_B$ illustrated in FIGURE 9). The thus obtained assembly provides a wing spar-frame combination having a good resistance to torsion.

As has been said earlier, because of the large extension of the high-lift device according to the invention, it is advisable in practice, in order to withstand the torsion, to make use of an aircraft comprising a central fuselage and two lateral beams (FIGURE 8).

When the aircraft is flying at cruising speed or at high speed, i.e. when all the high-lift devices are in their retracted position within the respective portions of the wing 1, the banking manoeuvre or the lateral stability of the aircraft can be advantageously provided by a mechanical control connected to the stick which actuates, on the required side, a lift spoiler.

According to an alternative embodiment, the mechanical control can actuate differentially the wing-tips pivotally mounted about appropriate spindles and forming banking flaps.

When on the contrary, the aircraft flies at reduced speed, all high-lift devices being then in a completely extended position, the banking manoeuvre can be carried out as follows.

The high-lift devices are in the first place selectively brought to the transistory position, as has been fully described hereabove with reference to FIGURES 1 to 11.

From then on, only the high-lift devices of the wing portions comprised between the fuselage 17 and the lateral beams $18_A$, $18_B$, are brought into the maximum curvature position, as shown in FIGURE 6.

On the contrary, the high-lift devices of both end-portions of wing 1 as shown in FIGURE 8 are only brought into the neutral intermediate position as shown in FIGURE 7.

From then on, the stick is automatically connected, through electric contacts, with the electric motor or motors controlling the transmission which in turn actuates the nuts on the jacks 5A of the supports for the flaps 6 of the two high-lift devices, which are in the neutral position.

The electric arrangement is such that both nuts actuating the jacks 5A rotate in opposite directions to each other when the control electric motor or motors are fed through the stick being actuated by the pilot. Because of this arrangement, it can be seen that when the stick is inclined, the curvature increases for one of the high-lift devices which then tends to take up the maximum curvature position (FIGURE 6), while the curvature decreases for the other device which tends to take up the transitory stage position (FIGURE 5). In other words, both high-lift devices act differentially, as would two banking flaps in a conventional aircraft.

It is obvious that if the control jacks of the high-lift devices are actuated by a single central motor, it will be necessary to provide a special control for the high-lift devices of the two end-portions.

Instead of the embodiment just described according to which an electric contact is automatically established so that the stick controls the jacks of the devices for the end-portions as soon as the maximum extension of the high-lift devices of the portions other than the two extreme ones has been reached, provision can be made for an electric control contact, mounted on the stick and actuated at the pilot's will.

According to an alternative embodiment which enables the operational sensitiveness of the differential control to be increased by means of the high-lift devices of both end-portions, the electric contact can take up three different positions which are proportional to the amplitude of shift of the stick.

For low amplitude shifts, the motor or motors actuating the jacks of extreme devices are fed with a lower voltage than normal; for medium amplitude shifts, these motors are fed with a normal voltage; for great amplitudes, they are fed with a higher voltage than normal.

The mechanism controlling the extension and the retraction into the wing of the first high-lift flap 6 will now be described in greater detail with more particular reference to FIGURES 13, 14, 15, 16, 17, 18, and 19, it being noted that these figures show only one of each element of the mechanism, while in reality the mechanism comprises two symmetrical elements of each kind for each wing portion.

As has already been described, near the trailing edge of each wing portion 1, lateral arms 2A and 2B are pivotally connected at 3 (for a purpose of clarity, the reference A stands for one member and B for the symmetrical member disposed on the opposite side of the wing portion).

Figure 14:
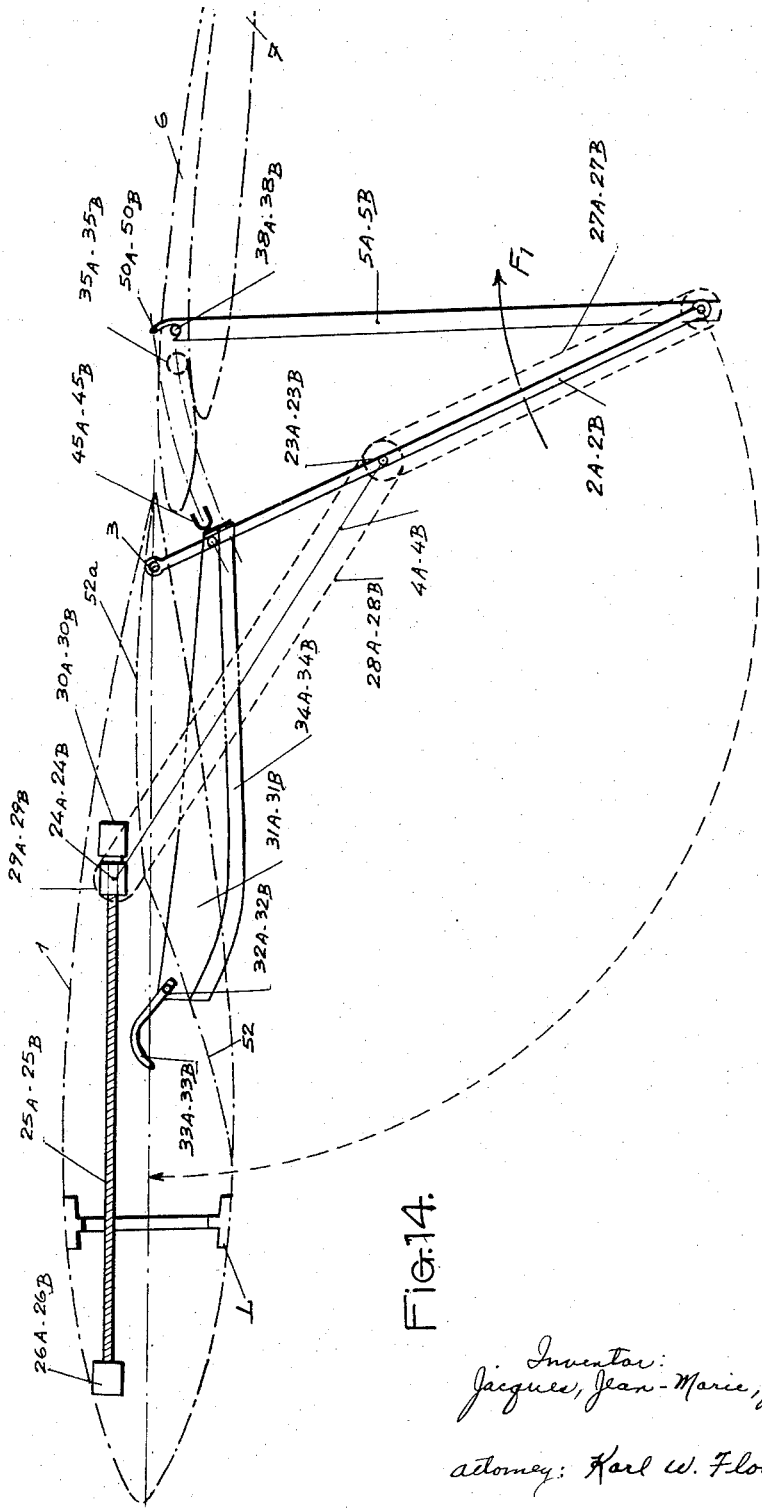

The pivoting of the arm 2A, 2B about is pivot 3, to pass from the retracted position shown in FIGURE 13 to the extended position shown in FIGURE 14, is carried out by means of a control arm 4A, 4B.

The latter is pivotally mounted at one end thereof on a pivot 23A, 23B secured to the arm 2A, 2B in the upper part thereof, while its other end is articulated on a sliding member 24A, 24B, capable of sliding along a rod 25A, 25B. In order to obtain a synchronised movement of both sliding members 24A, 24B, they are advantageously tapped and the rods 25A, 25B are threaded and rotated by driving mechanisms 26A, 26B, which are in turn driven by a common motor (not shown).

As has already been stated, the jack 5A, 5B is pivoted on the lower end of the pivoting arm 2A, 2B. The jack can be operated hydraulically, pneumatically or mechanically. In the embodiment shown by way of example, a mechanical control is provided.

In practice, the arms 2A, 2B and 4A, 4B are shaped as casings, inside which are disposed endless chains 27A, 27B and 28A, 28B enabling the motion to be transmitted from the sliding member 24A, 24B to the jack 5A, 5B.

The power take-off which is required only when the arm 2A, 2B is in an extended position, i.e. when the jack is in operational position, can readily be provided because of the fact that the spindle of the driving pinion 29A, 29B of the chain 28A, 28B, which is mounted on the sliding member 24A, 24B, comprises a pinion or bevel gear which meshes with a corresponding pinion or bevel gear mounted within a fixed casing 30A, 30B. These pinions or gears, mounted in the casings 30A, 30B, are themselves rotated by a suitable common motor (not shown), which is actuated at the proper moment.

The control arm 2A, 2B, controls the extension of a lateral member 31A, 31B, which is pivotally mounted on the one hand, on the arm 2A, 2B, and on the other hand, on a lug 32A, 32B freely sliding in a slide member 33A, 33B, the shape of which is designed in a way such as to enable said lateral member 31A, 31B to be completely retracted into the wing 1, when the arms 4A, 4B and 2A, 2B are in the folded position shown in FIGURE 13.

This lateral member 31A, 31B comprises a slide bar 34A, 34B, in which may roll a roller 35A, 35B, loosely mounted on the lateral face of the first flap 6. When the latter is within the wing 1, it is therefore carried, on the one hand, by said roller 35A, 35B resting in the slide bar 34A, 34B, and, on the other hand, by a sliding member 36A, 36B (see FIGURE 19) capable of sliding along a supporting rod 37A, 37B integral with the wing 1, under the action of a suitable driving mechanism (not shown) causing, for example, a rotation of the rod 37A, 37B, which is then threaded, whereas the sliding member 36A, 36B is tapped.

The first flap 6 comprises, moreover, a supporting lug 38A, 38B disposed on its lateral face, slightly behind the roller 35A, 35B, when looking in the direction toward the trailing edge of said flap 6, said lug acting as a supporting point for the head of the jack 5A, 5B, as will be more fully described hereafter.

The head of the jack (see especially FIGURES 16, 17 and 18) comprises a notch 39A, 39B open on the leading edge side, and into the bottom of which can enter and be housed the lug 38A, 38B. A locking device of the rocker type can lock said lug in position at the bottom of the notch. This locking device, in the actual exemplary embodiment, consists of a member 40A, 40B pivotally mounted on a spindle 41A, 41B, the lower section of said member having a circular shape so as to cap the lug 38A, 38B and lock it at the bottom of the notch 39A, 39B. In order to facilitate the approach and the putting into position of said locking member onto the lug, said member is rendered eccentric in relation to its pivot pin 41A, 41B.

Figure 16:
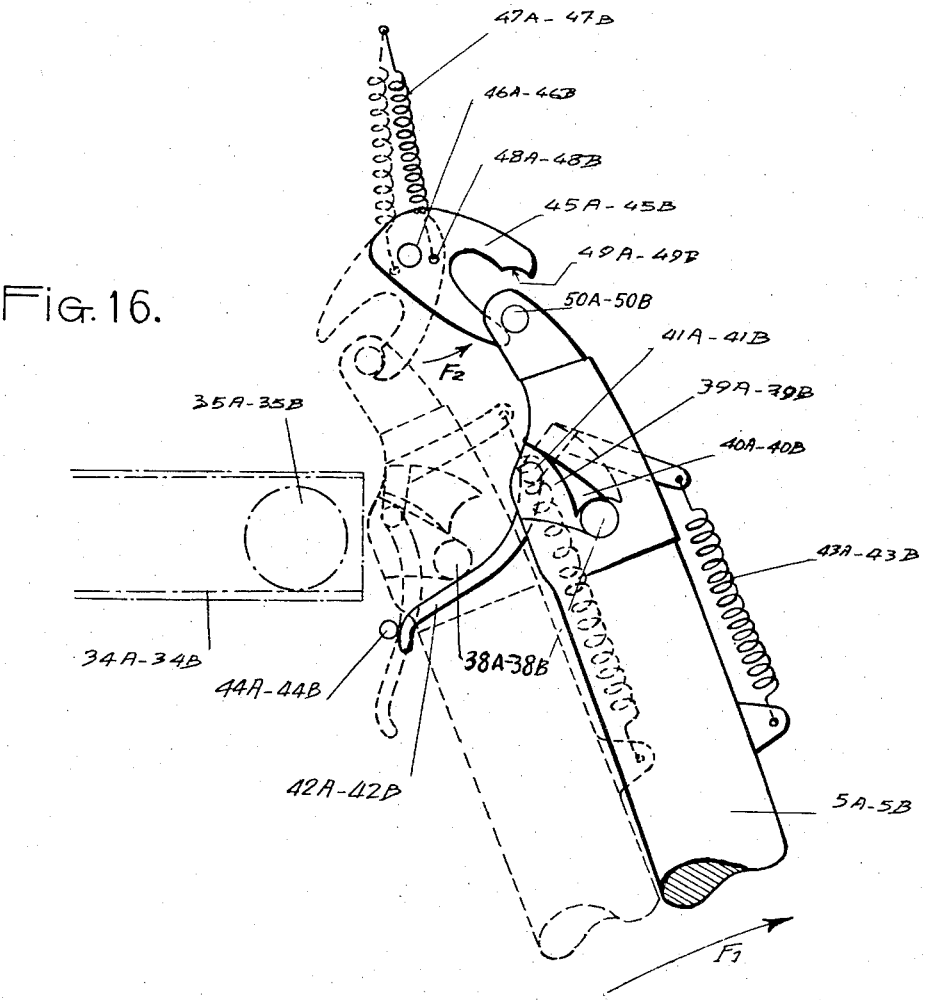
FIGURE 16 is a detail view showing in elevation the upper extremity of the jack in two different operational positions.

The pivot pin is rotated by means of an outer lever 42A, 42B, which is secured to said pivot and of a return spring 43A, 43B which is constantly urging the movable member 40A, 40B into locking position, shown in full line in FIGURES 16 and 17.

When the supporting arm 2A, 2B is in the course of extension and reaches its extended position shown in FIGURE 2, the jack 5A, 5B then takes up the dotted line position of FIGURE 16. At this moment, the lever 42A, 42B bears with its central part against a stop 44A, 44B integral with the supporting arm 2A, 2B, and the movable member 40A, 40B is then in its unlocked position, i.e. the notch 39A, 39B is opened.

When flap 6 is getting near to its fully extended position, the jack 5A, 5B is still held in position against the supporting arm 2A, 2B by a locking device consisting of a movable stirrup member 45A, 45B pivotally mounted on a spindle 46A, 46B, which is integral with the supporting arm 2A, 2B and held in its locked position by means of a return spring 47A, 47B, the attachment point of which 48A, 48B on the movable stirrup member is offset in relation to the pivot pin 46A, 46B. One of the wings of the movable stirrup member comprises a circular groove 49A, 49B, which, in locking position, caps a spindle 50A, 50B integral with the head of the jack.

When the flap 6 is nearing its maximum extended position, i.e. when the supporting roller 35A, 35B nears the extremity of the slide bar 34A, 34B, there occurs a transfer of the support of said flap, because the lug 38A, 38B comes to rest at the bottom of the notch 39A, 39B.

The flap 6, continuing its movement of translation, it can be seen that the roller 35A, 35B escapes from the slide bar 34A, 34B, and that, from this moment, the flap is being supported, on the one hand, by the sliding member 36A, 36B on the rod 37A, 37B, and, on the other hand, by the lug 38A, 38B in its turn supported by the jack 5A, 5B. Under the action of the flap, the jack is pivoted, about its pivoting point on the supporting arm 2A, 2B, in the direction of the arrow F1, this resulting in:

(1) A pivoting of the movable stirrup member 45A, 45B in the direction of the arrow F2 and therefore the unlocking of the head of the jack;

(2) The return spring 43A, 43B bringing the movable member 40A, 40B progressively into locking position of the lug 38A, 38B at the bottom of the notch 39A, 39B, as the lever 42A, 42B being suitably shaped, slides on the fixed stop 44A, 44B.

Figure 3:
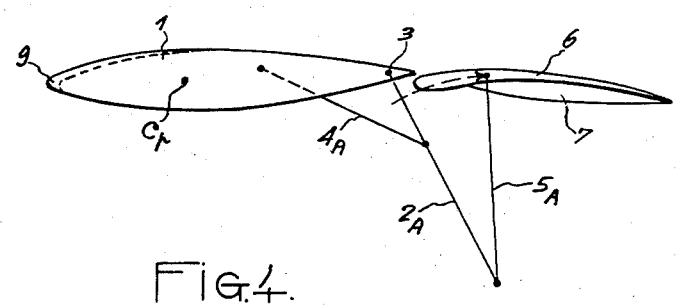
FIGURE 3 is a diagrammatic view showing the same wing portion after extension of the first flap.

The flap 6 can therefore continue without danger its movement of translation to reach its position of maximum extension of FIGURE 3, also shown in dotted lines in FIGURES 14 and 19.

The return and retraction of the flap 6 into the wing-portion 1 are effected in the opposite manner to the extending operations, i.e. the jack 5A, 5B is firstly pivoted into the opposite direction to the arrow F1, until the roller 35A, 35B bears in the slide bar 34A, 34B. At this time, the lever 42A, 42B engages the stop 44A, 44B, while the spindle 50A, 50B engages the movable stirrup member 45A, 45B. As the movement of the flap 6 continues, the spindle 50A, 50B, and consequently the jack, are locked, while the lug 38A, 38B, and consequently the flap, are, on the contrary, unlocked. When the sliding member 36A, 36B reaches substantially the position P (see FIGURE 19) on the rod 37A, 37B, a lug carried thereby (not shown) bears on a movable cam 51A, 51B which is connected to a closing trap 52, pivotally mounted on a pivot-pin 53 integral with the wing 1. This trap has a twin purpose: (1) to facilitate the air flow by closing the lower surface of the wing, when the flap 6 is in an extended position (position 52 in FIGURES 14 and 19), by causing the trap to merge with a fixed inner fairing 52a, and (2) to provide, in the position 52b for the smoothness of the wing-section, when the flaps 6 and 7 are in a retracted position.

As the sliding member 36A, 36B bears on the cam 51A, 51B, the latter starts pivoting the trap 52 about its hinge 53, thus opening a passage for the flap 6 and enabling it to take up the completely retracted position shown in full lines in FIGURE 19, the trap taking then the position 52b also shown in full lines. It is also pointed out that the trap 52 has inner projections onto which bears the leading edge of the first flap, when in retracted position, which results in locking the trap 52 in the position shown in full lines, the correct air flow along the wing section being then ensured by said trap, and thereafter by the lower surface of the second flap 7 which is in turn retracted under the first flap 6.

The function of trap 52 is shown in FIGURE 20 where the slide $36_A$—$36_B$, moving in the direction of arrow $F_1$ hits cam $51_A$—$51_B$ and forces trap 52 to pivot in the direction of arrow $F_2$ against the action of a return spring. This pivoting of the trap opens a passage to the group of flaps 6 and 7.

In the FIGURE 21 trap 52 is opened to the maximum. Slide $36_A$—$36_B$, icontinuing its movement in the direction of arrow $F_1$, leaves cam $51_A$—$51_B$, and trap 52 bears against the lower surface of flap 7 under the effect of the return spring.

In order to extend flaps 6 and 7, the trap 52 rubs against the lower surface of flap 7 and goes up automatically into the position shown in FIGURE 20 as soon as slide $36_A$—$36_B$ leaves cam $51_A$—$51_B$.

Morever, it must likewise be observed that the slide bar 34A, 34B, which is carried by the movable lateral plate 31A, 31B (see FIGURES 13 and 14), is so shaped that when the supporting arms 2A, 2B and 4A, 4B as well as the movable lateral plate 31A, 31B are in an entirely retracted position (FIGURE 13), the roller 35A, 35B of the first flap is situated in the slide bar 34A, 34B, which then locks the first flap 6 accurately in place within the wing portion 1.

It will be clear, on the other hand, that movable fairings (not shown) close the wing 1 beneath the supporting arms 2A, 2B and the jack 5A, 5B, when the latter are in an entirely retracted position. It is pointed out moreover, that two adjacent supporting arms of two adjacent wing portions can be inter-connected and thus be extended and retracted together. Similarly, two adjacent masterribs can be inter-connected and form a single reinforced master-rib.

The mechanism for the extension and for the pivoting of the front slat 9 will now be described in detail in reference to FIGURES 23 and 24.

This mechanism essentially comprises two supporting arms 8A, 8B, each having two inter-hinged parts about vertical hinges 54A, 54B. The front ends of the supporting arms are pivotally mounted on vertical pivots $54A_1$, $54B_1$ integral with the front slat 9, while the rear ends of said arms are pivotally mounted on vertical pivots $54A_2$, $54B_2$ integral with the supporting plates 55A, 55B, which are in turn integral with horizontal pivots 56A, 56B pivotally mounted in suitable supports (not shown), integral with the corresponding wing portion. Because of these foldable and pivotally mounted supporting arms 8A, 8B, it can already be seen that the slat 9 will be capable: (1) of passing from its retracted position (FIGURE 3) to its completely extended position (FIGURE 4) or vice-versa through unfolding and folding of the arms, as may be seen in FIGURES 23 and 24; (2) of pivoting from its horizontal position (FIGURE 4) into its inclined position for landing (FIGURE 6), by pivoting the said supporting arms 8A, 8B about the pivots 56A, 56B, this rocking movement being achieved by acting on the horizontal hinges 57A, 57B which are integral with the plates 55A and 55B, by a rotation as shown by the arrow F3, following a pull as shown by the arrow F4.

In order to obtain a completely synchronised unfolding and folding of the two supporting arms 8A, 8B, these are inter-connected by a synchronising mechanism, for example with irreversible worms.

For the sake of simplicity and clarity, there is diagrammatically shown in FIGURES 23 and 24, a very simple synchronising mechanism. It consists in connecting the rear portions of the supporting arms 8A, 8B by means of two links 58A, 58B, one of the ends of which is respectively secured to a lever 59A or 59B integral with the corresponding rear portion of the supporting arms 8A, 8B, and the other ends of which are respectively articulated to the opposed sides of an endless chain 60, wound around two idly mounted toothed pinions 61A and 61B.

In order that the front slat 9 may be prevented from rocking around pivots 56A, 56B, before it reaches its fully extended position of FIGURE 4 and in order to guide and support it, there are provided two lateral slide bars 62A, 62B, the front extremities of which are integral with the front slat 9 and the rear portions of which are respectively inserted into hollow supports of complementary shape, forming sliding members 63A, 63B, said members being integral with the wing portion 1.

The rear ends 64A and 64B of the slide bars 62A, 62B are bevelled in such a way that, when the supporting arms 8A, 8B are completely unfolded (FIGURE 24) the slide bars 62A, 62B rest within the sliding members 63A, 63B by their bevelled ends 64A, 64B, this enabling the arms 8A, 8B, and consequently the front slat, to be rocked about the pivots 56A, 56B, located very close to the bevels. As soon as the front slat has been returned to its horizontal position of FIGURE 4, and the arms 8A and 8B have been slightly folded, the slide bars 62A, 62B have sufficiently entered into the sliding members 63A, 63B to be entirely conformed to the shape thereof and thus prevent any rocking of the front slat, or any lateral displacement thereof, which could not have been prevented by the articulated arms 8A, 8B, if these had been present alone.

The control arangement is obviously such that when the first flap 6 has reached its fully extended position of FIG. 3, the motor which has moved it, then brings the front slat 9 into its fully extended position of FIGURE 4.

It has already been explained in connection with FIGURES 10 and 12, how a torsion-resisting wing-spar frame combination could be obtained.

It must be observed in connection with the flaps 6 and 7, and particularly in connection with the first flap shown in FIGURE 25, that a valuable embodiment may consist in providing two lateral supporting ribs 65A and 65B connected to the two control-jacks 5A, 5B, as well as at least one intermediate supporting rib 66 adapted to journal on a slide $36_C$ which slides on a support bar 67, which is here represented as being square, the rib 66 adapting itself to the said support bar 67 when the flap 6 is in the extended position (see FIGURES 26 and 27).

The control mechanism for extending and retracting the second high-lift flap 7 will now be described in detail with particular reference to FIGURES 19, 28 to 31.

The leading edge of the flap 7 (see FIGURES 28, 29, 30 and 31) comprises at either extremity thereof a member 68A, 68B which engages said leading edge, said members 68A, 68B being provided with an outer arm 69A, 69B, having at its free end an outwardly directed lug 70A, 70B, the function of which will be explained later. A second arm 71A, 71B connected by a cross-bar 72A, 72B to the arm 69A, 69B, forms with the latter a kind of stirrup, the wings of which are connected by a pivotpin 73A, 73B to a slide bar 74A, 74B.

The flap 7 is supported inside and under the first flap 6 by means of the slide bars 74A, 74B which bear on respective racks diagrammatically shown at 75A and 75B in FIGURES 32, 33 and 34 the teeth thereof being directed downwardly and the upper portion thereof being smooth and acting as a slide for the slide bars 74A, 74B. The flap 6 cannot be rocked about the pivot pin 73A, 73B of the slide bars, as the extreme portion of the arm 69A, 69B bears under the inner face of the flap 6, along which it slides when the flap 6 is shifted.

The movement of the slide bars 74A, 74B, and therefore of the flap 7, according to the embodiment given by way of explanation in FIGURES 29, 30 and 31, is obtained as follows:

A toothed pinion 76A, 76B, keyed to the pivot pin 73A, 73B and being in constant mesh with the rack 75A, 75B, enables the flap 7 to be shifted through the rotation of said pinion. To ensure that this shift of the flap shall be well balanced, both slide bars 74A, 74B must move at exactly the same speed. This is achieved by causing a single driving motor 77 to drive simultaneously both pinions 76A, 76B, through two symmetrical pinion-transmissions, one of said transmissions being diagrammatically shown at 78B in FIGURE 29, both these transmissions being engaged by a common transmission bevel-pinion 79 keyed on the driving shaft of the motor, which is in turn located close to and inside the leading edge of the flap 7.

FIGURES 32, 33, 34, 35 and 36, show the mechanism, provided for the locking and the control of the second high-lift flap 7, when the latter reaches its position of maximum extension.

This mechanism consists of two symmetrical systems arranged on the lateral faces and within the first flap 6. For the sake of clarity of the drawing, only one of these systems is shown with duplicated reference numerals applied thereto.

This mechanism essentially consists of a lever 79A, 79B hinged at the upper extremity thereof about a spindle 80A, 80B integral with the flap 6. At the lower end of the lever 79A, 79B are articulated:

On the one hand, a second lever 81A, 81B;

On the other hand, a third twin lever 82A, 82B. This lever (see FIGURE 35) consists of two lateral cheeks 83 and 84 inter-connected at the ends thereof by two front crossbars 85 and 86 and a rear cross-bar 89 forming a stop, said cheeks comprising, moreover, on the front portions thereof identical notches 87 and 88 shaped as a wide V. The rear end of the twin lever hinges on pivot pin 90A, 90B, which acts also as an articulation between the levers 79A, 79B and 81A, 81B.

Between both cheeks 83, 84, and the front cross-bars 85, 86 of the twin lever 82A, 82B, is placed and can shift a dummy lever 91A, 91B, having a notch 92, identical to the notches provided on the cheeks 83, 84, the rear end of said dummy lever being pivotally connected on a spindle 93A, 93B integral with the lever 81A, 81B. The assembly consisting of the twin lever and the dummy lever is constantly urged by a spring (not shown for the clarity of the drawing), so that the upper portion of the heads of said levers bears constantly against the lower face of the flap 6, as can be seen in FIGS. 32 and 33.

The lower extremity of the lever 81A, 81B comprises a spindle 94A, 94B, to which is pivotally connected the end of a link 95A, 95B, the front part of which is capable of sliding within a tube acting as a slide 96A, 96B, the free end of which is articulated on a spindle secured to a lever 104A, 104B pivotally mounted on the flap 6 (see FIGURE 36), its positioning at 105A, 105B on the slide bar 36A, 36B being suitably selected so that a simultaneous downward rocking will occur, by means of the link 106A, 106B, of the second flap in relation to the first flap, when the latter passes from the transitory position (FIGURE 5) to the landing position (FIGURE 6) or vice-versa, as will be more fully described hereafter.

On the pivot pin 90A, 90B earlier referred to, is pivotally mounted the end of a link 97A, 97B, constantly urged forward by a return spring 98A, 98B.

This link 97A, 97B comprises a guiding and shift-limiting slot 99A, 99B which slides on a lug 100A, 100B integral with the first flap 6. Lastly a lock 101A, 101B enables this movable link 95A, 95B to be made integral with its slide 96A, 96B when said movable link has reached a predetermined position, as will be more fully explained hereafter.

The operation of the mechanism which has just been described is as follows:

The various movable elements being in the respective positions shown in FIGURE 30, the flap 7 is moved towards its extended position by the drive motor 77 and by the driving arrangement diagrammatically illustrated at 78B (FIGURE 29). During this displacement of the flap 7, the slide bar 74A, 74B moves on the slide member 75A, 75B, while the extremity of the arm 69A, 69B slides under the lower face of the flap 6. When the lug 70A, 70B on the arm 69A, 69B meets the end of the dummy lever 91A, 91B, it slides along the end surface of the slot 92 (FIGURE 35) on said dummy lever, which acts then as a cam, to take up the position shown in FIGURE 32.

It must be noted that this sliding motion of the lug 70A, 70B in the slot 92 results in a pivoting of the flap 7 about the pivot 73A, 73B of the slide bar 74A, 74B, bringing it to a slightly negative incidence, as seen in FIGURE 5.

From then on, as the flap 7 continues its movement, the lug 70A, 70B will push the dummy lever 91A, 91B into the cheeks 83, 84 of the twin lever 82A, 82B until the three notches 87, 88 and 92 come into alignment on the lug 70A, 70B. During this operational stage, the lever 81A, 81B has pivoted in the direction of the arrow F5, entraining the movable link 95A, 95B which has slid inside the guiding tube 96A, 96B.

The various movable elements are then in the respective positions shown in FIGURE 33, it being important to note that the lever 81A, 81B carries a stop 102A, 102B which is then in engagement with the section of the cross-plate 89 of the twin lever 82A, 82B, the assembly consisting of the dummy lever 91A, 91B, the twin lever 82A, 82B and the lever 81A, 82B forming from then on a rigid unit.

During the next stage, as the flap 7 continues its movement of translation towards its position of maximum extension, it can be seen that the unit formed by the dummy lever, the twin lever and the lever 81A, 81B will move backwards, while causing:

(1) The lever 79A, 79B to rotate about its pivot 80A, 80B until it reaches an extreme position defined by the sliding and the rotation of the link 97A, 97B to its limit position defined by the lug 100A, 100B abutting the forward bottom portion of the slot 99A, 99B;

(2) The movable link 95A, 95B to slide within the guiding tube 96A, 96B until it reaches a limit position in which the lock 101A, 101B makes said movable link integral with said guiding tube;

(3) The pivots 90A, 90B and 73A, 73B to coincide. The distance between the lug 70A, 70B of the arm 69A, 69B and the pivot 73A, 73B of the slide bar 74A, 74B is equal to the distance between the bottom part of the slots 87, 88 of the twin lever 82A, 82B and the pivot 90A, 90B. In order that both these pivots should be in exact alignment, the head of the metallic member 73A, 73B forming the pivot carries a circular stop 73a (FIGURE 34) which at the end of the stroke of the flap 7 caps a projecting head of the pivot 90A, 90B.

It has to be observed that, at this moment, the slide bar 74A, 74B is also locked on its slide 75A, 75B, and that the unit consisting of the dummy lever, and the twin lever comes into alignment with a window 103A, 103B provided in the upper face of the flap 6.

The flap 7 is then locked in the completely extended position thereof; the entire wing-curve is in a transitory position with a double chamber shown in FIGURE 5 and the control and locking mechanism of the flap 7 is in the position shown in FIGURE 34.

If, at this moment, the first high-lift flap 6 is downwardly inclined by means of the jacks 5A, 5B, the second flap 7 will also become inclined in relation to the first flap 6 by pivoting about the pivot pin 73A, 73B of the slide bars 74A, 74B and the pivot 90A, 90B, both these pivots coinciding, the aforedescribed locking mechanism pivoting because of the possibility afforded by the unit consisting of the dummy lever 91A, 91B, the twin lever 82A, 82B and the lever 69A, 69B with its lug 70A, 70B, of passing through the slot 103A, 103B provided in the flap 6. This rotation is effected in the direction of the arrow F6, after movement along the arrow F7.

The shifting of flap 6 between the positions of FIGURES 5, 6 and 7 is accomplished by linear displacement of jack 5 with respect to arm 2. This may be accomplished by the mechanical connections as shown in FIGURE 22. The lower part 5c of jack 5 is threaded and takes a nut E which is rotated through an angled counter-gear R by the shaft on which is keyed the gear-wheel S, driven by chain $27_A$, $27_B$.

It will be obvious that the diameter of the circles and the positioning of the centres of said circles along which move the pivots 90A, 90B, 73A, 73B and 94A, 94B are so designed that the second flap 7 is inclined in relation to the flap 6 in the required direction and to the required extent, so that the wing-section having the greatest lift i.e. during landing, shall be inscribed on a perfect arc of a circle, this arc subtending a large angle at the center of the said circle, with a favourable position of the three slots, as can be seen in FIGURE 6.

The operation of the device when passing from the landing position (FIGURE 7) to the transitory position (FIGURE 5) then to the position when the second flap is retracted (FIGURE 4) is identical to the operation which has just been described, the various stages occurring, obviously, in the reverse order.

It is to be observed, that to obtain a perfect operation of the device, the unlocking of the slide bars 74A, 74B and of the locks 101A, 101B must be effected simultaneously by means of a single control of any appropriate type. One of the types of mechanical control means that can be employed here would work as follows. Locking of the slides $74_A$—$74_B$ at the end of their run can be achieved by fitting, between the central motor 77 and the angled counter-gear 79 (FIGURE 29), an irreversible reducer (e.g. worm and wheel gearing).

On the other hand the control for retracting bolt $101_A$—$101_B$ (FIGURE 34) is effected by the well known system called a "Bowden cable" whose displacement is effected by a ratchet device attached to flap 6 and worked by the slide $74_A$—$74_B$ when this latter leaves its end-travel position. It is obvious that with this arrangement the simultaneous unlocking of slides $74_A$—$74_B$ and bolts $101_A$—$101_B$ is ensured.

The principal advantages of the high-lift, highly extensible device according to the invention can be summed up as follows:

The very high maximum lift coefficients provided by the final wing section comprising a front slat and two flaps, with a high optimum curvature inscribed on an arc of a circle having a wide angle of opening, with a plurality of slots, are applied to a wing having a large surface area, thus having a small load per surface-unit, resulting in a low minimum lift-speed.

This main consideration gives the possibility of greatly reducing the surface of the main wing for high speed and cruising speed, for a given landing speed.

It follows that the high-speed wing must be very heavy, since retractable elements, mechanisms and controls are added to its own weight, but this is not a drawback, as this wing is very small. For example, the cruising speed wing can have a surface one quarter that of the wing of a corresponding conventional aircraft, and twice as heavy per surface-unit, while finally enabling the total weight of the wing-unit to be reduced by half.

This gain of weight is considerably increased if it is considered that for a given operational load (cargo or military load), a given distance of flight (the greater it is, the more valuable this feature will become), and a given speed (the higher it will be, the greater the advantage), a reduction by three quarters of the surface of a wing, which by itself represents 80% of the total drag of a conventional aircraft, will necessarily lead to a sizable decrease of the power requirements of the engines, and thus of the total fuel consumption. Actually, a new and very appreciable reduction of the total aircraft weight will be achieved.

What I claim is:

1. In an aircraft, a wing having an airfoil section of low drag coefficient and low maximum lift coefficient, extensible means within said section for increasing the lift and drag coefficients of the wing comprising a slat, a first flap and a second flap, said extensible means increasing the wing chord by an amount at least as much as the chord of said airfoil section with the extensible means in a retracted position, and means for positioning said slat forwardly of said wing, said first flap rearwardly of said wing and said second flap rearwardly of said wing and said first flap with said slat, wing and first and second flaps substantially inscribed on the arc of a circle.

2. The apparatus of claim 1, said last mentioned means positioning said wing, slat and flaps spaced from each other so as to provide slot between adjacent parts of said wing, slat and flaps.

3. The apparatus of claim 1, said wing comprising a main spar having at least one transversely extending aperture therethrough, said last mentioned means comprising supporting structure extending through at least one of the apertures.

4. In an aircraft, a wing having an airfoil section of low drag coefficient and low maximum lift coefficient, extensible means within said section for increasing the lift and drag coefficients of the wing comprising a slat, a first flap and a second flap, said extensible means increasing the wing chord by an amount at least as much as the chord of said airfoil section with the extensible means in a retracted position, and means for positioning said slat forwardly of the wing, said first flap rearwardly of the wing and said second flap rearwardly of the wing and of the first flap with said wing, said slat and said first and second flaps defining a second airfoil section having a double curvature.

5. In an aircraft, a wing having an airfoil section of low drag coefficient and low maximum lift coefficient, extensible means within said section for increasing the lift and drag coefficients of the wing comprising a slat, a first flap and a second flap, said extensible means increasing the wing chord by an amount at least as much as the chord of said airfoil section with the extensible means in a retracted position, and means for positioning said slat forwardly of the wing, said first flap rearwardly of the wing and said second flap rearwardly of the wing and of the first flap with said wings, said slat, and said first and second flaps defining a second airfoil section having a single curvature and said second flap positioned contiguous to said first flap, whereby substantial airflow between said two flaps is prevented.

6. In an aircraft, a wing, an extensible flap associated with said wing adjacent the trailing edge thereof, a pair of spaced supporting arms pivotally mounted at the rear ends thereof adjacent the wing trailing edge, means for rotating said arms about their pivoted rear ends into a position in which said arms extend generally downwardly from adjacent said trailing edge, a jack carried by each of said arms, means for extending said flap, and means on each said jack engageable with said flap, whereby said flap may be moved relative to said wing by said jacks when in extended position.

7. The apparatus of claim 6, further characterized by said means for extending said flap including spaced parallel transversely extending rods therein, and a member movably mounted on each said rod, and further comprising means securing said members to said flap, a pair of spaced rollers secured to said flap, a pair of transversely extending guides in said wing and each receiving one of said rollers, said guides being open at their rear ends, a pair of lugs on said flap, said means on each said jack being engageable with one of said lugs.

8. The apparatus of claim 7, said means on each said jack comprising locking means for said lugs, means pivotally securing each jack at a lower end thereof to a lower part of one of said arms, means releasably locking each jack relatively to its associated arm, means responsive to movement of each jack about its pivot for locking each said lug locking means and for unlocking each jack locking means.

9. The apparatus of claim 6, there being further provided a second flap, means for slidably connecting said second flap to said first flap for movement in a front to rear direction, means for causing said second flap to slide with respect to said first flap between a retracted position with respect to said first flap to an extended position rearwardly thereof, means for causing said second flap to initially assume a fully extended position of a slightly negative incidence, and means for pivoting said first and second flap into positions in which, together with the wing, these aerodynamic elements are substantially inscribed in the arc of a circle.

References Cited in the file of this patent

UNITED STATES PATENTS

| | | |
|---|---|---|
| 1,780,838 | Page | Nov. 4, 1930 |
| 1,837,132 | Page | Dec. 15, 1931 |
| 1,881,463 | Gaines | Oct. 11, 1932 |
| 1,907,374 | Van Atta | May 2, 1933 |
| 2,137,879 | Ksoll | Nov. 22, 1938 |
| 2,147,968 | Delanne | Feb. 21, 1939 |
| 2,213,791 | Zap | Sept. 3, 1940 |
| 2,231,524 | Martin | Feb. 11, 1941 |
| 2,271,763 | Fowler | Feb. 3, 1942 |
| 2,323,279 | Van Zelm | June 29, 1943 |
| 2,361,574 | Tampier | Oct. 31, 1944 |
| 2,379,355 | Hodgdon | June 26, 1945 |
| 2,389,160 | Manson | Nov. 20, 1945 |
| 2,580,841 | Ross | Jan. 1, 1952 |
| 2,583,405 | Youngman | Jan. 22, 1952 |
| 2,743,886 | Driggs | May 1, 1956 |

FOREIGN PATENTS

| | | |
|---|---|---|
| 359,087 | Great Britain | Oct. 22, 1931 |
| 390,432 | Great Britain | Apr. 6, 1933 |
| 594,801 | Great Britain | Nov. 19, 1947 |
| 978,181 | France | Nov. 22, 1950 |